United States Patent
Butuc et al.

(10) Patent No.: US 7,736,556 B2
(45) Date of Patent: Jun. 15, 2010

(54) REVISED CURE CYCLE FOR ANNULAR PACKING UNITS

(75) Inventors: Stefan Butuc, The Woodlands, TX (US); Shafiq Khandoker, Houston, TX (US)

(73) Assignee: Hydril USA Manufacturing LLC, Houston, TX (US)

(*) Notice: Subject to any disclaimer, the term of this patent is extended or adjusted under 35 U.S.C. 154(b) by 366 days.

(21) Appl. No.: 11/829,811

(22) Filed: Jul. 27, 2007

(65) Prior Publication Data

US 2008/0023865 A1    Jan. 31, 2008

Related U.S. Application Data

(60) Provisional application No. 60/847,760, filed on Sep. 28, 2006, provisional application No. 60/820,723, filed on Jul. 28, 2006, provisional application No. 60/862,392, filed on Oct. 20, 2006, provisional application No. 60/912,809, filed on Apr. 19, 2007.

(51) Int. Cl.
 *B29C 45/76* (2006.01)
(52) U.S. Cl. ..................................... 264/40.6
(58) Field of Classification Search .............. 264/40.6, 264/40.1
 See application file for complete search history.

(56) References Cited

U.S. PATENT DOCUMENTS

| | | | |
|---|---|---|---|
| 2,609,836 A | 9/1952 | Knox | |
| 3,004,783 A | 10/1961 | Webb | |
| 3,667,721 A | 6/1972 | Vujasinovic | |
| 3,762,725 A | 10/1973 | Taylor | |
| 4,371,483 A * | 2/1983 | Mattson | 264/40.6 |
| 5,116,017 A | 5/1992 | Granger et al. | |
| 5,207,956 A * | 5/1993 | Kline et al. | 264/40.6 |
| 5,213,339 A | 5/1993 | Walworth | |
| 5,224,557 A | 7/1993 | Yenulis et al. | |
| 5,361,832 A * | 11/1994 | Van Winkle | 166/84.4 |
| 5,729,463 A | 3/1998 | Koenig et al. | |
| 5,784,283 A * | 7/1998 | Rimondi et al. | 700/198 |
| 5,851,013 A | 12/1998 | Simons | |
| RE36,452 E | 12/1999 | Upton et al. | |
| 6,345,834 B1 | 2/2002 | Bianchini et al. | |
| 6,542,859 B1 | 4/2003 | Burns et al. | |
| 6,554,247 B2 | 4/2003 | Berckenhoff | |
| 2001/0020386 A1 | 9/2001 | Mancosu et al. | |
| 2004/0017104 A1 | 1/2004 | Fakhoury et al. | |
| 2004/0066003 A1 | 4/2004 | Griffin et al. | |

(Continued)

OTHER PUBLICATIONS

T.J.R. Hughes, J.A. Cottrell, Y. Bazilevs, Isogeometric analysis: CAD, finite elements, NURBS, exact geometry and mesh refinement, Comput. Methods Appl. Mech. Engrg. 194 (2005) 4135-4195.

(Continued)

*Primary Examiner*—Jill L Heitbrink
(74) *Attorney, Agent, or Firm*—Potomac Patent Group PLLC

(57) ABSTRACT

A method to manufacture a blowout preventer seal including disposing at least one insert and at least one elastomeric material in a mold, heating the mold to a cure temperature, curing the at least one elastomeric material, measuring a temperature of the at least one elastomeric material during the curing, adjusting a cure time and the cure temperature based on the measured temperature of the elastomeric material, and removing the cured blowout preventer seal from the mold.

24 Claims, 16 Drawing Sheets

U.S. PATENT DOCUMENTS

2005/0264563 A1 12/2005 Macura et al.
2007/0140729 A1 6/2007 Carter et al.

OTHER PUBLICATIONS

Technical Paper, "Nonlinear Finite Element Analysis of Elastomers", MSC Software Corporation 2000.

T. Lindby and J.L.T. Santos, "2-D and 3-D shape integrate analytical optimization using mesh velocities sensitivities with associative CAD", Structural Optimization 13, 213-222, Springer-Verlag 1997.

K.K. Choi, V. Ogarevic, J. Tang, and Y.H. Park, "CAD-Based Design Process for Fatigue Analysis, Eliabilityanalysis, and Design Optimization", Automotive Research Center, Oct. 2004.

* cited by examiner

REVISED CURE CYCLE FOR ANNULAR PACKING UNITS

CROSS-REFERENCE TO RELATED APPLICATIONS

This Application claims the benefit of the following provisional applications under 35 U.S.C. 119(e): U.S. Patent Application Ser. No. 60/820,723 filed on Jul. 28, 2006; U.S. Patent Application Ser. No. 60/847,760 filed on Sep. 28, 2006; U.S. Patent Application Ser. No. 60/862,392 filed on Oct. 20, 2006; and U.S. Patent Application Ser. No. 60/912,809 filed on Apr. 19, 2007, all incorporated by reference in their entirety herein.

BACKGROUND OF DISCLOSURE

1. Field of the Disclosure

Embodiments disclosed herein relate generally to blowout preventers used in the oil and gas industry. Specifically, embodiments relate to methods of curing and manufacturing seals for use in blowout preventers, in which the seals may include elastomeric and rigid materials.

2. Background Art

Well control is an important aspect of oil and gas exploration. When drilling a well, for example, safety devices must be put in place to prevent injury to personnel and damage to equipment resulting from unexpected events associated with the drilling activities.

Drilling wells involves penetrating a variety of subsurface geologic structures, or "layers." Occasionally, a wellbore will penetrate a layer having a formation pressure substantially higher than the pressure maintained in the wellbore. When this occurs, the well is said to have "taken a kick." The pressure increase associated with a kick is generally produced by an influx of formation fluids, which may be a liquid, a gas, or a combination thereof, into the wellbore. The pressure kick tends to propagate from a point of entry in the wellbore uphole (from a high-pressure region to a low-pressure region). If the kick is allowed to reach the surface, drilling fluid, well tools, and other drilling structures may be blown out of the wellbore. Such "blowouts" may result in catastrophic destruction of the drilling equipment (including, for example, the drilling rig) and substantial injury or death of rig personnel.

Because of the risk of blowouts, devices known as blowout preventers are installed above the wellhead at the surface or on the sea floor in deep water drilling arrangements to effectively seal a wellbore until active measures can be taken to control the kick. Blowout preventers may be activated so that kicks are adequately controlled and "circulated out" of the system. There are several types of blowout preventers, the most common of which are annular blowout preventers (including spherical blowout preventers) and ram blowout preventers. Each of these types of blowout preventers will be discussed in more detail.

Annular blowout preventers typically use large annular, rubber or elastomeric seals having metal inserts, which are referred to as "packing units." The packing units may be activated within a blowout preventer to encapsulate drillpipe and well tools to completely seal an "annulus" between the pipe or tool and a wellbore. In situations where no drillpipe or well tools are present within the bore of the packing unit, the packing unit may be compressed such that its bore is entirely closed. As such, a completely closed annular blowout preventer packing unit acts like a shutoff valve. Typically, the packing unit may be quickly compressed, either manually or by machine, to result in a seal thereabout and to prevent well pressure from causing a blowout.

An example of an annular blowout preventer having a packing unit is disclosed in U.S. Pat. No. 2,609,836, issued to Knox, assigned to the assignee of the present disclosure, and incorporated herein by reference in its entirety. The packing unit of Knox includes a plurality of metal inserts embedded in an elastomeric body, in which the metal inserts are completely bonded with the elastomeric body. The metal inserts are spaced apart in radial planes in a generally circular fashion extending from a central axis of the packing unit and the wellbore. The inserts provide structural support for the elastomeric body when the packing unit is radially compressed to seal against the well pressure. Upon compression of the packing unit about a drillpipe or upon itself, the elastomeric body is squeezed radially inward, causing the metal inserts to move radially inward as well.

Referring now to FIG. 1, an annular blowout preventer 101 including a housing 102 is shown. Annular blowout preventer 101 has a bore 120 extending therethrough corresponding with a wellbore 103. A packing unit 105 is then disposed within annular blowout preventer 101 about bore 120 and wellbore 103, Packing unit 105 includes an elastomeric annular body 107 and a plurality of metal inserts 109. Metal inserts 109 are disposed within elastomeric annular body 107 of packing unit 105, which are distributed in a generally circular fashion and spaced apart in radial planes extending from wellbore 103. Further, packing unit 105 includes a bore 111 concentric with bore 120 of blowout preventer 101.

Annular blowout preventer 101 is actuated by fluid pumped into opening 113 of a piston chamber 112. The fluid applies pressure to a piston 117, moving piston 117 upward and translating force to packing unit 105 through a wedge face 118. The force translated to packing unit 105 from wedge face 118 is directed upward toward a removable head 119 of annular blowout preventer 101, and inward toward a central axis of wellbore 103 of annular blowout preventer 101. Because packing unit 105 is retained against removable head 119 of annular blowout preventer 101, packing unit 105 does not displace upward from the force translated to packing unit 105 from piston 117. However, packing unit 105 does displace inward from the translated force, which compresses packing unit 105 toward central axis of wellbore 103 of the annular blowout preventer 101. In the event drillpipe is located within bore 120, with sufficient radial compression, packing unit 105 will seal about the drillpipe into a "closed position." The closed position is shown in FIG. 5. In the event a drillpipe is not present, packing unit 105, with sufficient radial compression, will completely seal bore 111.

Annular blowout preventer 101 goes through an analogous reverse movement when fluid is pumped into opening 115 of piston chamber 112. The fluid translates downward force to piston 117, such that wedge face 118 of piston 117 allows the packing unit 105 to radially expand to an "open position." The open position is shown in FIG. 4. Further, removable head 119 of annular blowout preventer 101 enables access to packing unit 105 such that packing unit 105 may be serviced or changed if necessary.

Referring now to FIGS. 2, 3A, and 3B together, packing unit 105 and metal inserts 109 used in annular blowout preventer 101 are shown in more detail. In FIG. 2, packing unit 105 includes an elastomeric annular body 107 and a plurality of metal inserts 109. Metal inserts 109 are distributed in a generally circular fashion and spaced apart in radial planes within elastomeric annular body 107. FIGS. 3A and 3B show examples of metal inserts 109 that may be disposed and embedded within elastomeric annular body 107. Typically, metal inserts 109 are embedded and completely bonded to elastomeric annular body 107 to provide a structural support for packing unit 105. The bond between annular body 107 and metal inserts 109 restrict relative movement elastomer within the elastomeric annular body 107. More discussion of the bonds between elastomeric bodies and metal inserts within a packing unit may be found in U.S. Pat. No. 5,851,013, issued to Simons, assigned to the assignee of the present disclosure, and incorporated herein by reference in its entirety.

Referring now to FIGS. 4 and 5, examples of packing unit 105 in the open position (FIG. 4) and closed position (FIG. 5) are shown. When in the open position, packing unit 105 is relaxed and not compressed to seal about drillpipe 151 such that a gap is formed therebetween, allowing fluids to pass through the annulus. As shown in FIG. 5, when in the closed position, packing unit 105 is compressed to seal about drillpipe 151, such that fluids are not allowed to pass through the annulus. In this manner, the blowout preventer may close the packing unit 105 to seal against wellbore pressure from the blowout originating below.

Similarly, spherical blowout preventers use large, semi-spherical, elastomeric seals having metal inserts as packing units. Referring to FIG. 6, an example of a spherical blowout preventer 301 disposed about a wellbore axis 103 is shown. FIG. 6 is taken from U.S. Pat. No. 3,667,721 (issued to Vujasinovic and incorporated by reference in its entirety). Spherical blowout preventer 301 includes a lower housing 303 and an upper housing 304 releasably fastened together with a plurality of bolts 311, wherein housing members 303, 304 may have a curved, semi-spherical inner surface. A packing unit 305 is disposed within spherical blowout preventer 301 and typically includes a curved, elastomeric annular body 307 and a plurality of curved metal inserts 309 corresponding to the curved, semi-spherical inner surface of housing members 303, 304. Metal inserts 309 are thus disposed within annular body 307 in a generally circular fashion and spaced apart in radial planes extending from a central axis of wellbore 103.

Additionally, ram blowout preventers may also include elastomeric seals having metal inserts. The large seals are typically disposed on top of ram blocks or on a leading edge of ram blocks to provide a seal therebetween. Referring now to FIG. 7, a ram blowout preventer 701 including a housing 703, a ram block 705, and a top seal 711 is shown. With respect to FIG. 7, only one ram block 705 is shown; typically, though, two corresponding ram blocks 705 are located on opposite sides of a wellbore 103 from each other (shown in FIG. 8). Ram blowout preventer 701 includes a bore 720 extending therethrough, bonnets 707 secured to housing 703 and piston actuated rods 709, and is disposed about central axis of a wellbore 103. Rods 709 are connected to ram blocks 705 and may be actuated to displace inwards towards wellbore 103. Rams blocks 705 may be pipe rams, variable bore rams, shear rams, or blind rams. Pipe and variable bore rams, when activated, move to engage and surround drillpipe and/or well tools to seal the wellbore. In contrast, shear rams engage and physically shear any wireline, drillpipe, and/or well tools in wellbore 103, whereas blind rams close wellbore 103 when no obstructions are present. More discussion of ram blowout preventers may be found in U.S. Pat. No. 6,554,247, issued to Berekenhoff, assigned to the assignee of the present disclosure, and incorporated herein by reference in its entirety.

Referring now to FIG. 8, ram blocks 705A, 705B and top seals 711A, 711B used in ram blowout preventer 701 are shown in more detail. As shown, top seals 711A, 711B are disposed within grooves 713 of ram blocks 705A, 705B, respectively, and seal between the top of ram blocks 705 and housing 703 (shown in FIG. 7). As depicted, ram block 705A is an upper shear ram block having top seal 705A, and ram block 705B is a lower shear ram block having top seal 705B. When activated, ram blocks 705A, 705B move to engage, in which shears 715A engage above shears 715B to physically shear drillpipe 151. As ram blocks 705A, 705B move, top seals 705A, 705B seal against housing 703 to prevent any pressure or flow leaking between housing 703 and ram blocks 705A, 705B.

Referring now to FIGS. 9A and 9B, top seals 711A, 711B are shown in more detail. As shown particularly in FIG. 9A, top seals 711A, 711B comprise an elastomeric band 751, elastomeric segments 753 attached at each end of elastomeric band 751, and a metal insert 755 disposed within each elastomeric segment 753. Top seal 705A for ram block 705A (i.e., the upper shear ram block) may also include a support structure 757 connected between elastomeric segments 753. As shown in a cross-sectional view in FIG. 9B, metal insert 755 disposed within elastomeric segment 753 has an H-shaped cross-section. The H-shaped cross-section of metal insert 755 should be understood that top seals 711A, 711B may be used with either pipe rams, blind rams, or shear rams (shown in FIG. 8).

Referring now to FIG. 10, a ram block 705A with a top seal and a ram packer 717A used in ram blowout preventer (e.g., 701 of FIG. 7) is shown. FIG. 10 is taken from U.S. Patent Application Publication No. 20040066003 (issued to Griffin et al. and incorporated herein by reference in its entirety). Instead of a shear rams (shown in FIGS. 7 and 8), FIG. 10 depicts a pipe ram assembly having a variable bore ram packer 717A comprised of elastomer and metal. As shown, variable bore ram packer 717A comprises an elastomeric body 761 of a semi-elliptical shape having metal packer inserts 763 molded in elastomeric body 761. Metal packer inserts 763 are arranged around a bore 765 of elastomeric body 761. As mentioned above with respect to pipe rams or variable bore rams, when activated, ram packer 717A (along with a corresponding ram packer oppositely located from ram packer 717A) moves to engage and surround drillpipe and/or well tools located in bore 765 to seal the wellbore.

For any seal mechanism comprising elastomers and metal in blowout preventers (e.g., packing units in the annular and spherical blowout preventers and top seals and ram packers in the ram blowout preventer), loads may be applied to contain pressures between various elements of the blowout preventers. For example, with respect to the annular blowout preventer shown in FIG. 1, as the fluid force is translated from piston 117 and wedge face 118 to packing unit 105 to close packing unit 105 towards central axis of wellbore 103, the fluid force generates stress and strain within packing unit 105 at areas and volumes thereof contacting sealing surfaces (e.g., wedge face 117 and drillpipe 151) to seal against wellbore pressure from below. The stress occurring in packing unit 105 is roughly proportional to the fluid force translated to packing unit 105.

As stress is incurred by blowout preventer seals, the material of the seals will strain to accommodate the stress and provide sealing engagement. The amount of strain occurring in the material of the seal is dependent on a modulus of elasticity of the material. The modulus of elasticity is a measure of the ratio between stress and strain and may be described as a material's tendency to deform when force or pressure is applied thereto. For example, a material with a high modulus of elasticity will undergo less strain than a material with a low modulus of elasticity for any given stress. Of the materials used in blowout preventer seals, the metal inserts have substantially larger moduli of elasticity than the elastomeric portions. For example, the modulus of elasticity for steel (typically about 30,000,000 psi; 200 GPa) is approximately 20,000-30,000 times larger than the moduli of elasticity for most elastomers (typically about 1,500 psi; 0.01 GPa).

Historically, when examining, designing, and manufacturing seals for blowout preventers, such as packing units for blowout preventers, the locations and amounts of stress and/or strain (i.e., stress concentrations, strain concentrations) occurring within the seal have been the largest concern and received the most attention and analysis. As the seal is subject to loads (e.g., repetitive and cyclic closures of a packing unit of an annular blowout preventer about a drillpipe or about itself), the magnitude and directions of the stresses and strains occurring across the seat are evaluated to determine the performance of the seal. A common technique used for this evaluation is finite element analysis ("FEA"). Specifically, FEA may be used to simulate and evaluate the stress and/or strain concentrations which occur across the seal under given displacement conditions.

When designing and manufacturing high strain elastomeric seals containing rigid inserts, there may be a significant discrepancy between the theoretical stress and strain predicted by FEA and actual stress and strain. Thus, current modeling and analysis techniques for blowout preventer seals may not provide adequate information to improve their design and manufacture.

Additionally, performance of a manufactured seal may also depend upon the properties of the elastomeric material used. Properties of the elastomeric material depend not only on the base material (elastomer) properties, but also on the degree of curing, or degree of crosslinking, of the elastomeric material obtained during seal manufacture. For example, excessively cured or crosslinked elastomeric material may be rigid and not function properly; i.e., curing may affect the modulus of elasticity of the elastomeric material. Under-cured elastomeric material may lack resiliency.

Accordingly, there exists a need for methods to improve the design, manufacture, and curing processes for blowout preventer seals.

SUMMARY OF THE CLAIMED SUBJECT MATTER

In one aspect, embodiments disclosed herein relate to a method to manufacture a blowout preventer seal including disposing at least one insert and at least one elastomeric material in a mold, heating the mold to a cure temperature, curing the at least one elastomeric material, measuring a temperature of the at least one elastomeric material during the curing, adjusting a cure time and the cure temperature based on the measured temperature of the elastomeric material, and removing the cured blowout preventer seal from the mold.

In another aspect, embodiments disclosed herein relate to method to manufacture a blowout preventer seal including generating a finite element analysis thermal model for a blowout preventer seal design and manufacturing the blowout preventer seal based on a result of the finite element analysis thermal model. Preferably, the finite element analysis thermal model is used to estimate a degree of curing of at least one elastomeric material of the blowout preventer seal.

Other aspects and advantages will be apparent from the following description and the appended claims.

DETAILED DESCRIPTION

Figure 1:
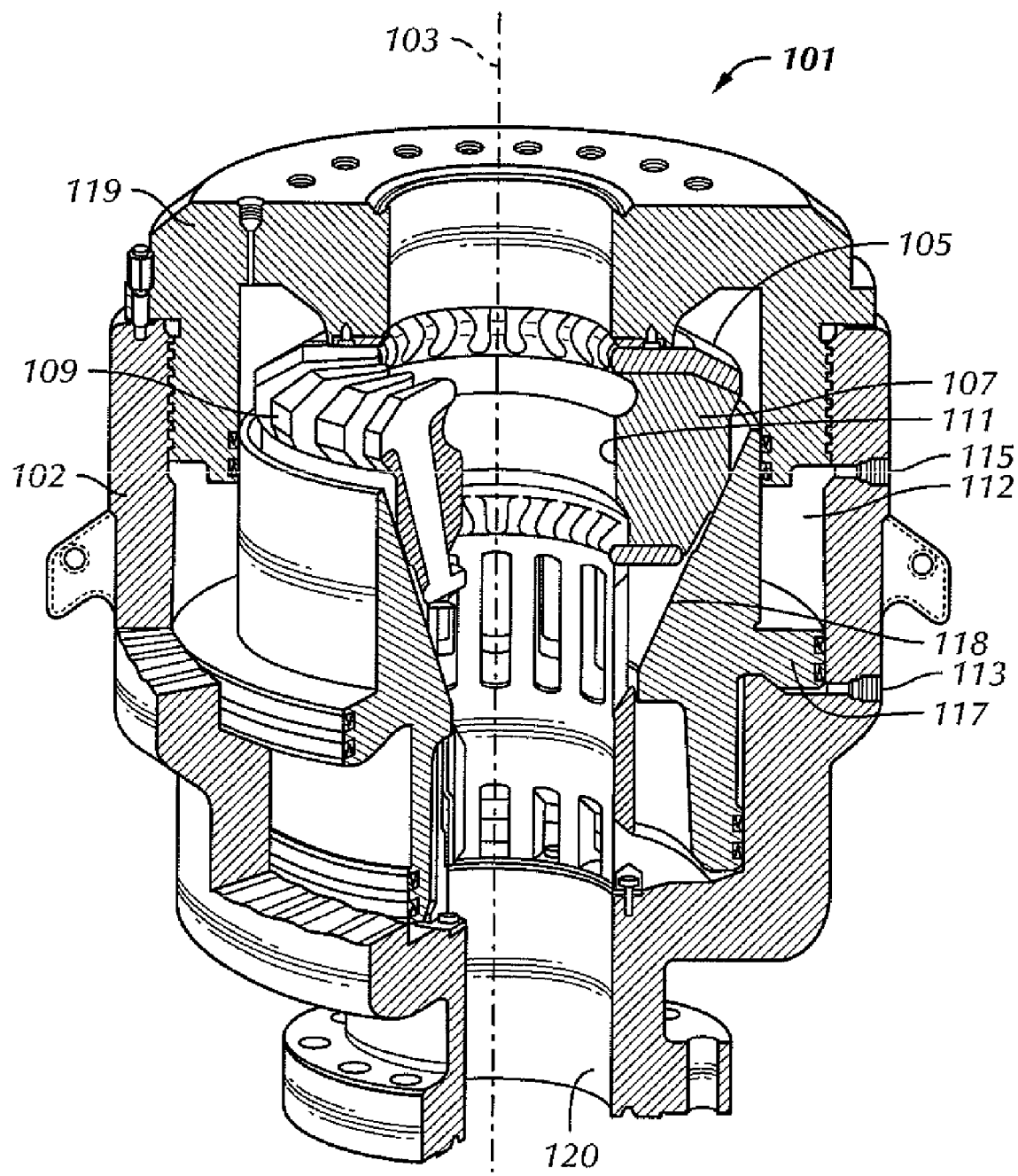
FIG. 1 is a cross-sectional view of an annular blowout preventer.
Figure 2:
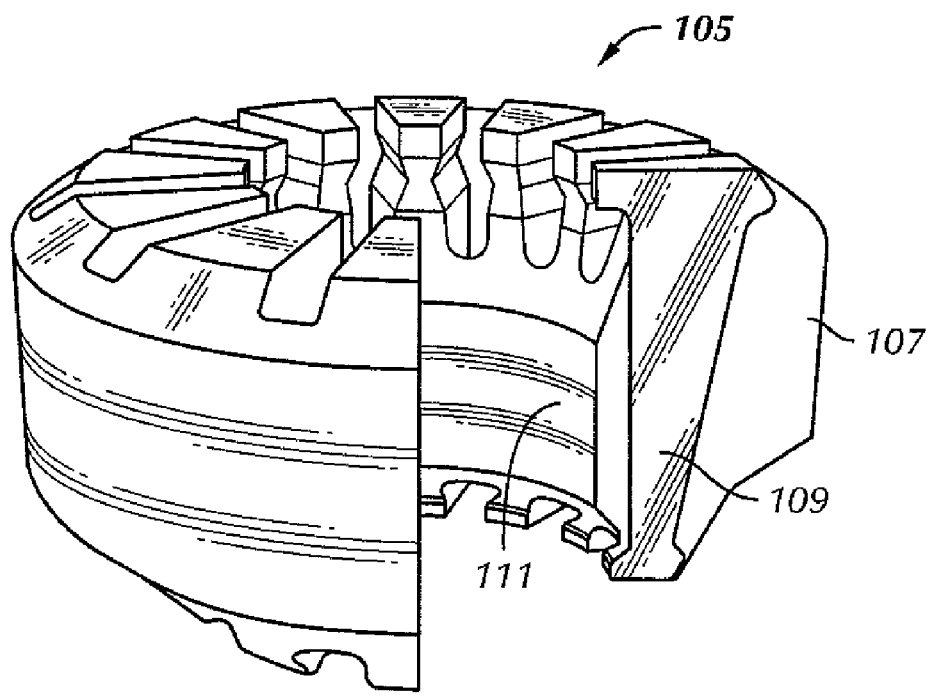
FIG. 2 is a cross-sectional view of a packing unit for an annular blowout preventer.
Figure 3A:
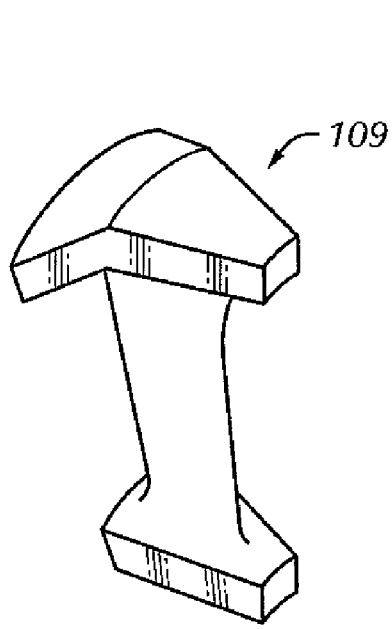
FIG. 3A is a perspective view of a metal insert for a packing unit for an annular blowout preventer.
Figure 3B:
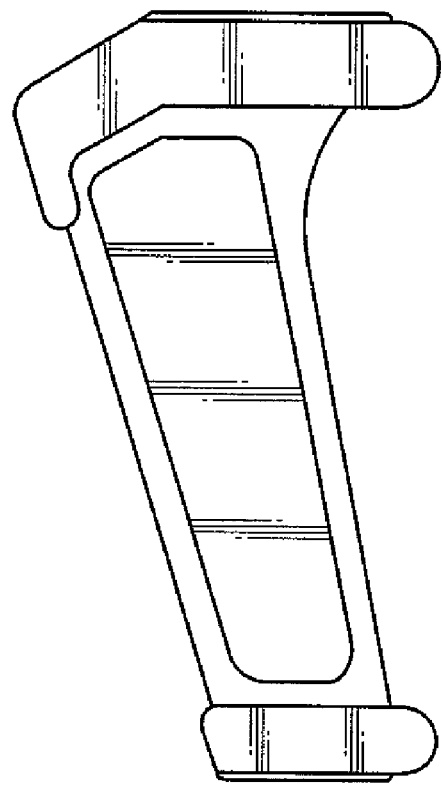
FIG. 3B is a side view of an alternative metal insert for a packing unit for an annular blowout preventer.
Figure 4:
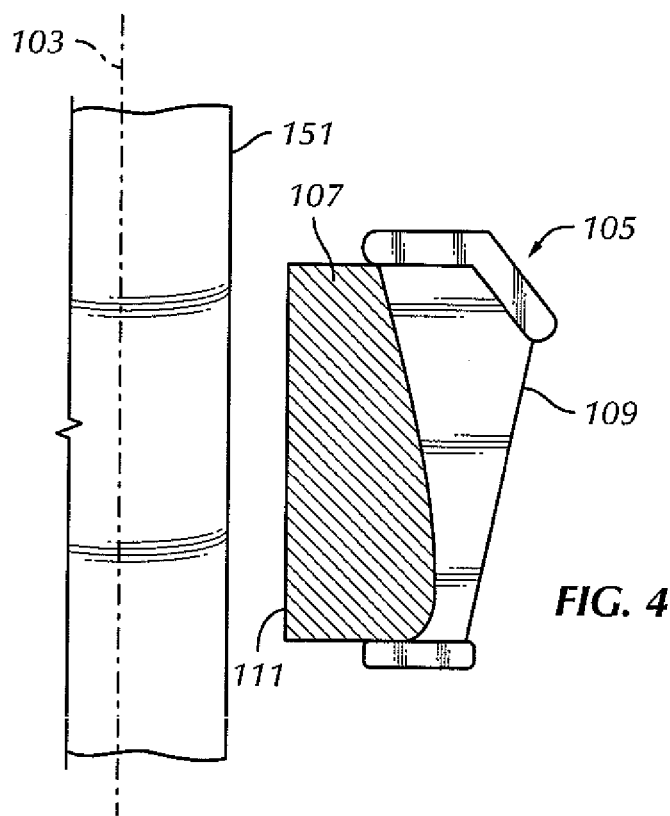
FIG. 4 is a cross-sectional view of a prior art packing unit for an annular blowout preventer shown in a relaxed position.
Figure 5:
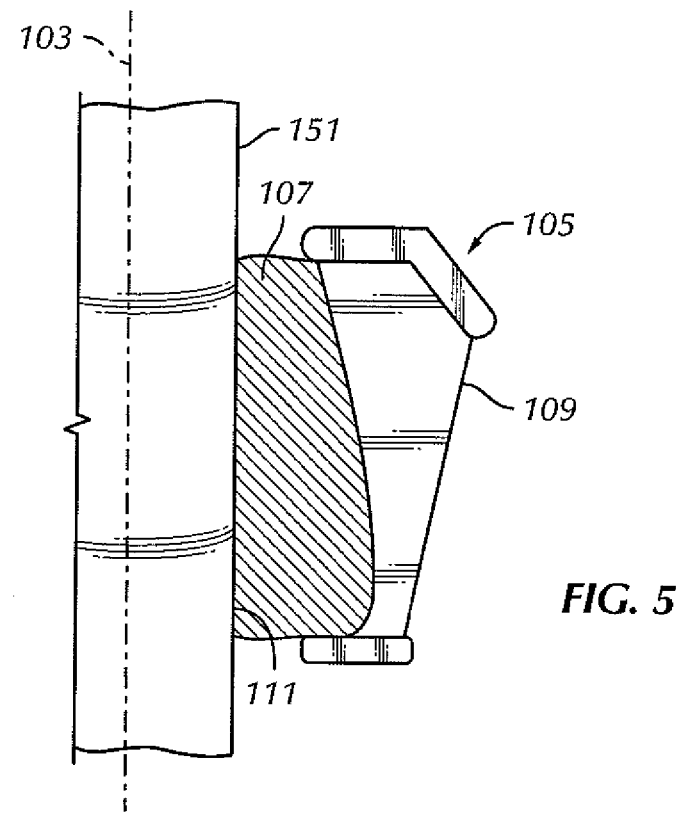
FIG. 5 is a cross-sectional view of a packing unit for an annular blowout preventer in a closed position.
Figure 6:
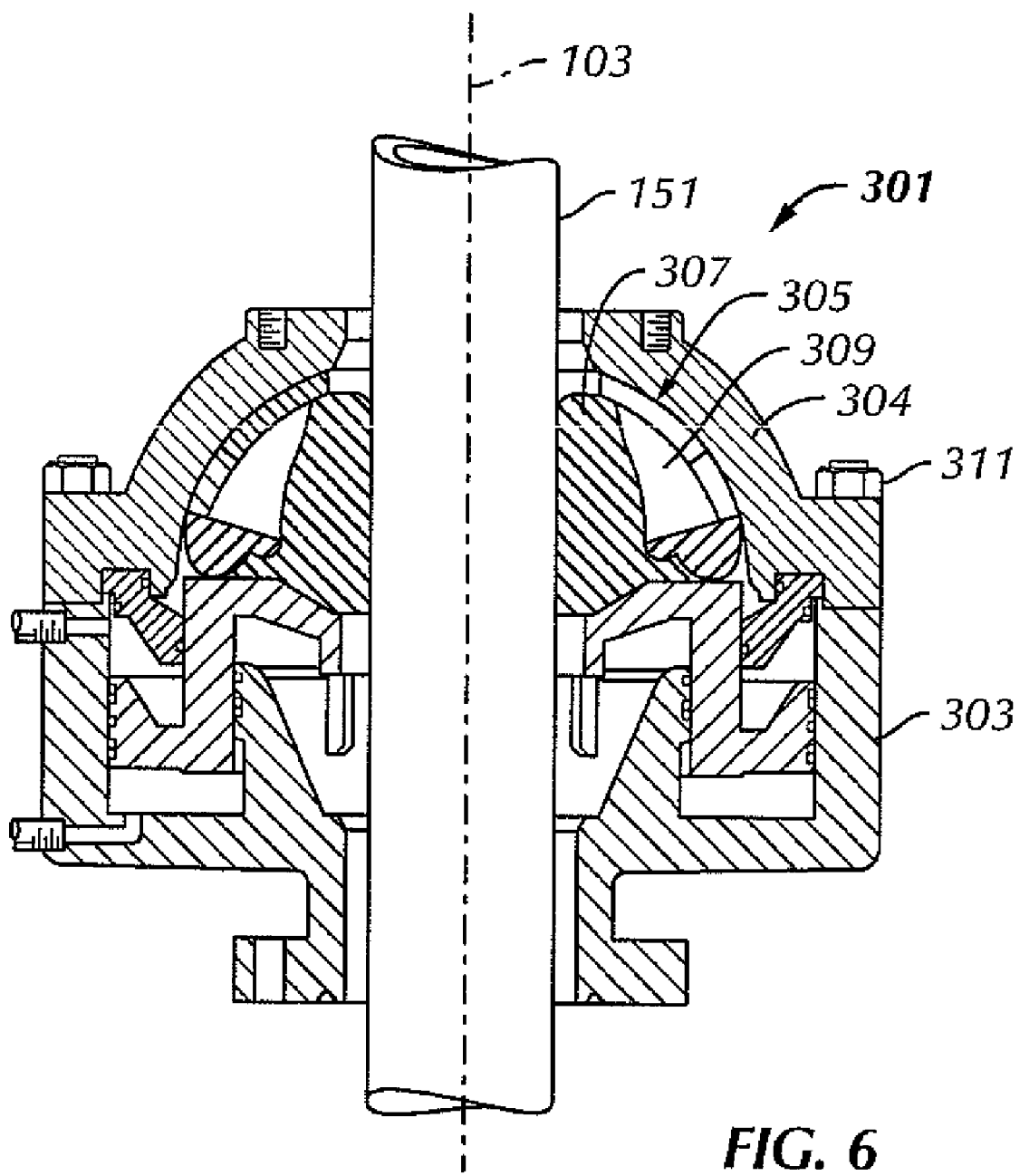
FIG. 6 is a cross-sectional view of a spherical blowout preventer.
Figure 7:
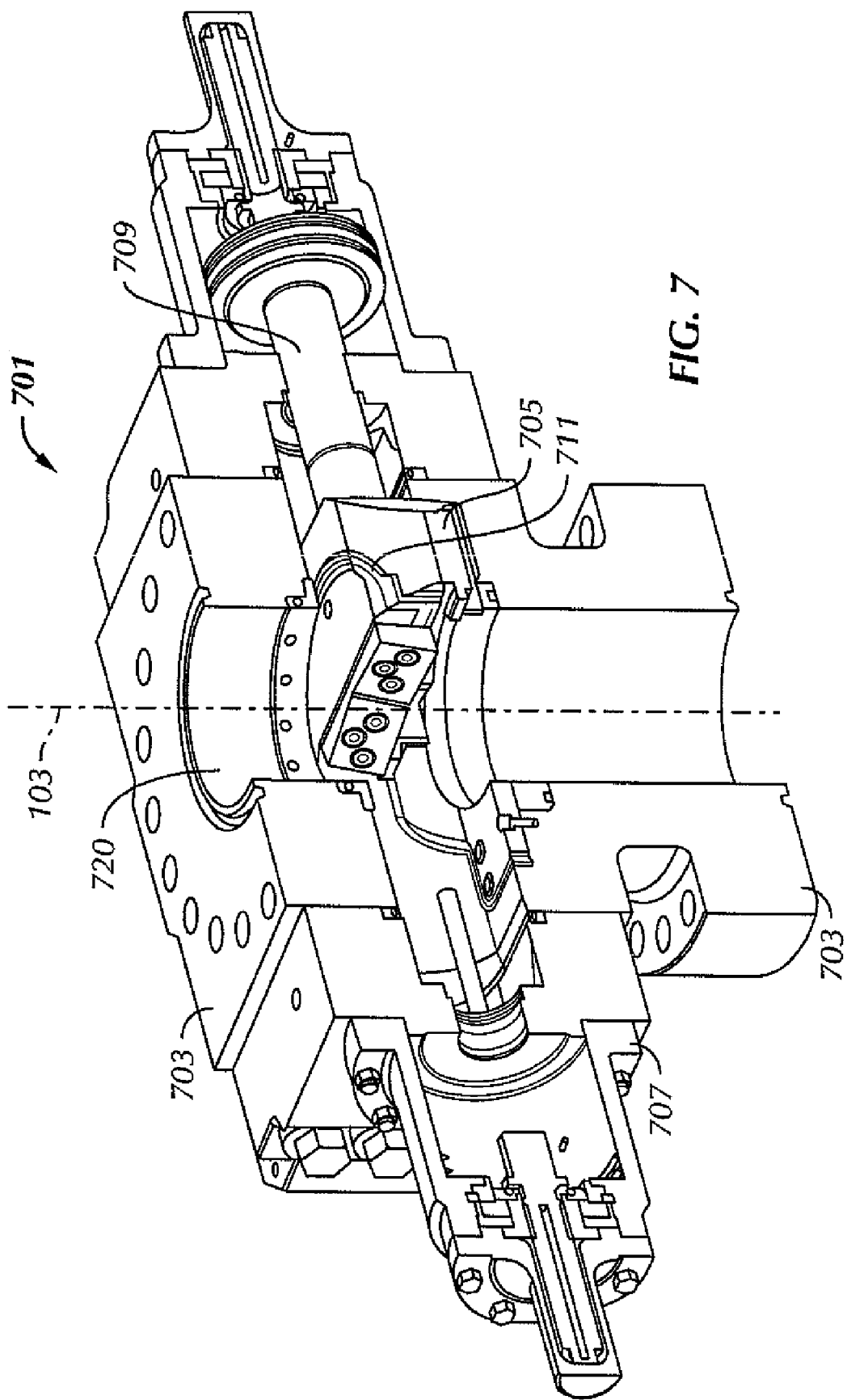
FIG. 7 is a cross-sectional view of a ram blowout preventer.
Figure 8:
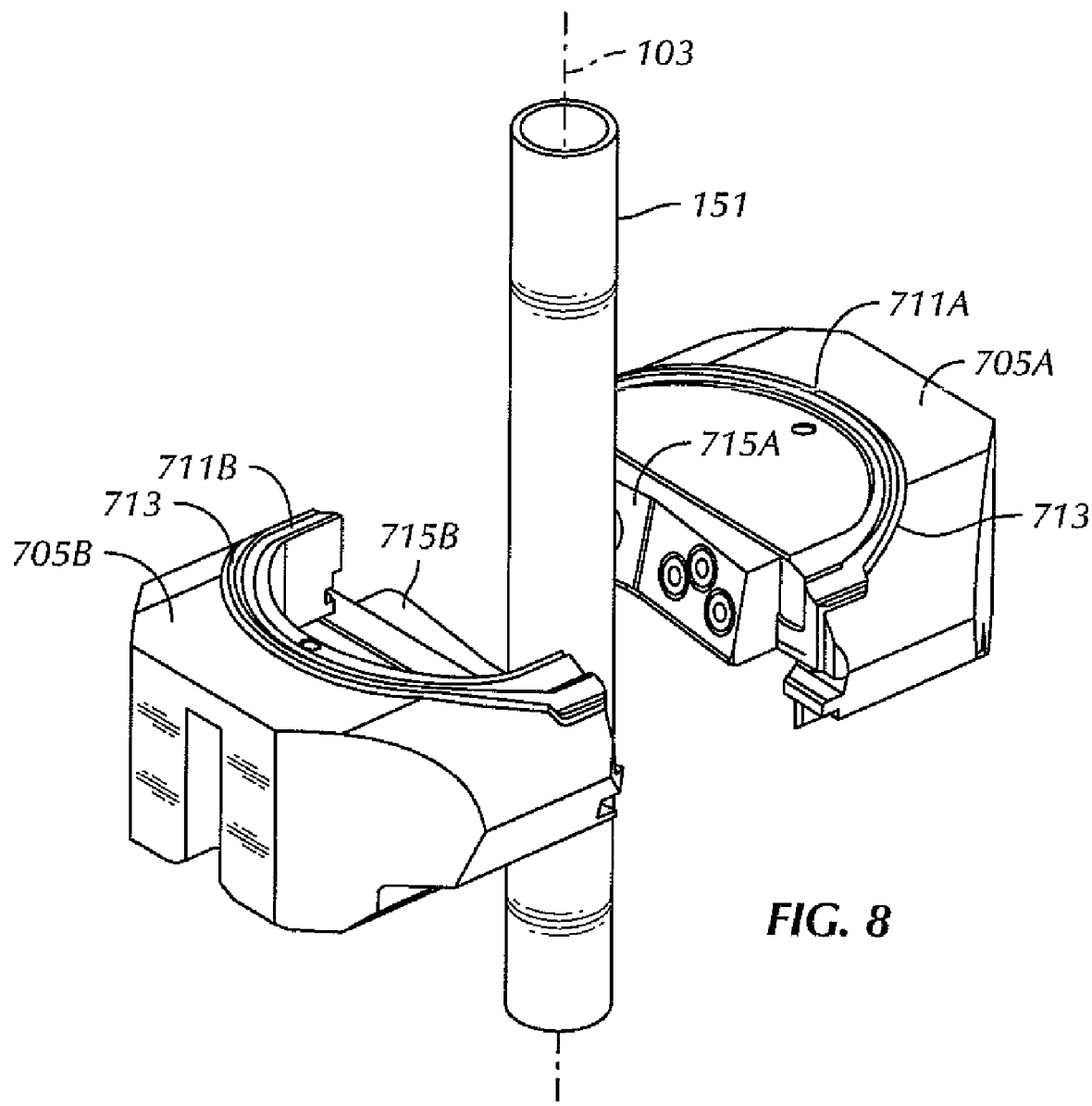
FIG. 8 is a perspective view of ram shears for a ram blowout preventer.
Figure 9A:
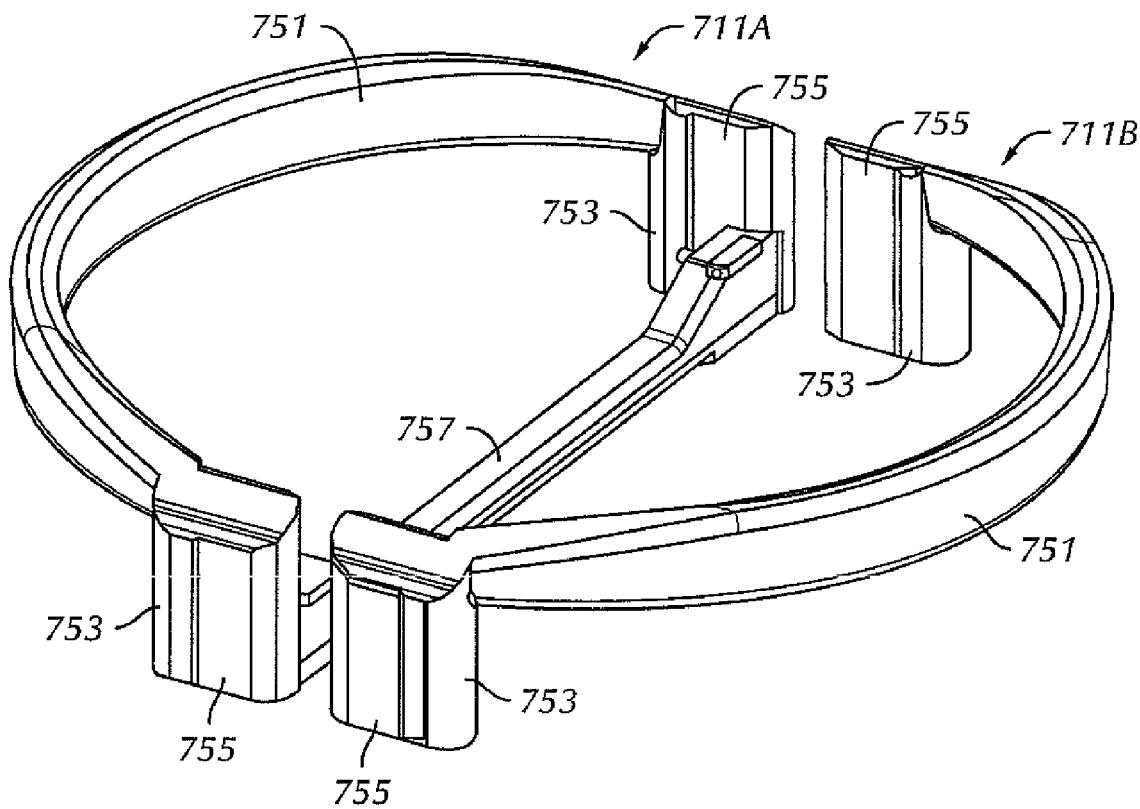
FIG. 9A is a perspective view of a top seal for ram blocks of a ram blowout preventer.
Figure 9B:
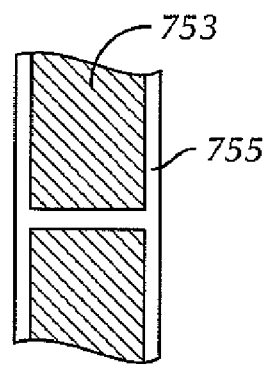
FIG. 9B is a cross-sectional view of a top seal for ram blocks of a ram blowout preventer.
Figure 10:
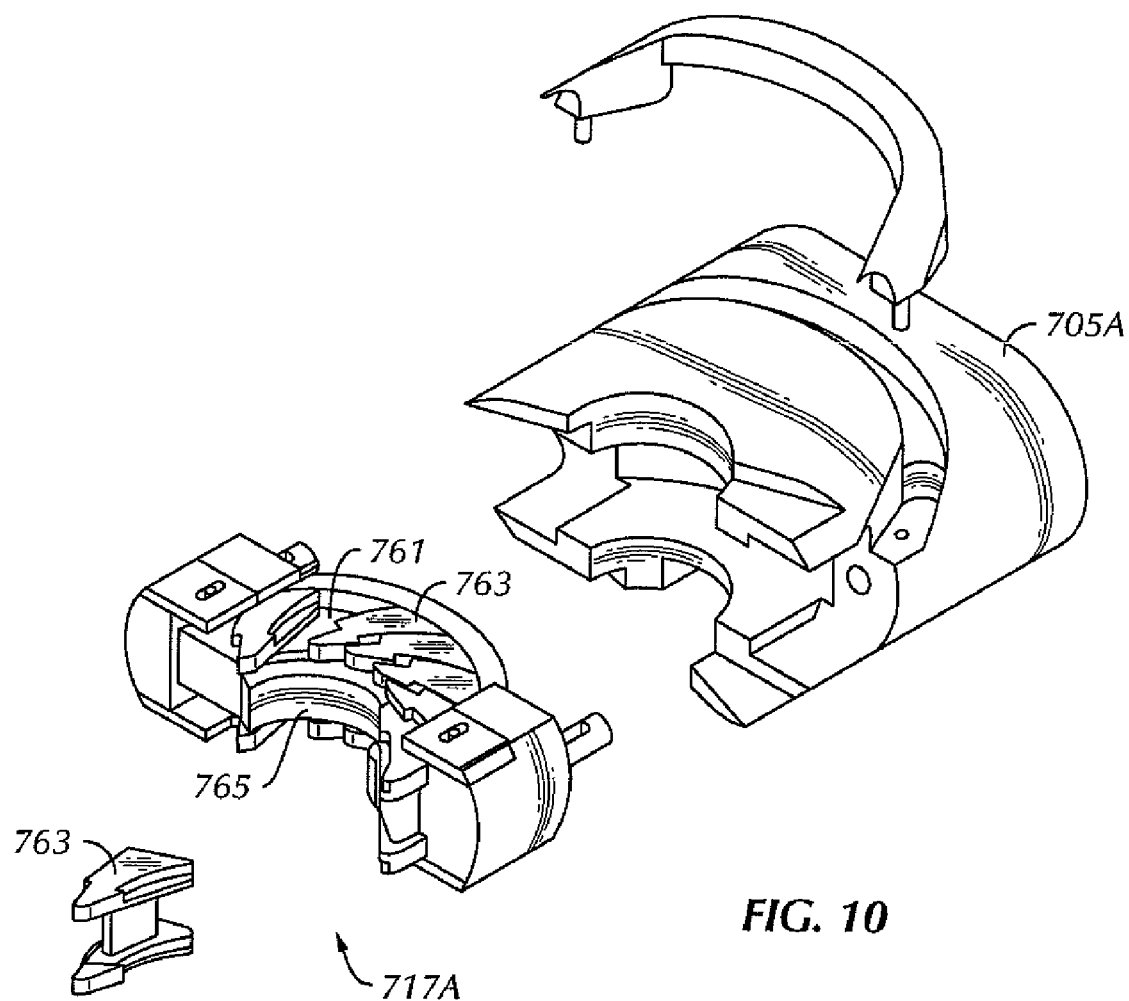
FIG. 10 is a perspective view of a variable bore ram packer for a ram block of a ram blowout preventer.

In one aspect, embodiments disclosed herein relate generally to blowout preventers used in the oil and gas industry. More particularly, embodiments relate to methods of curing and manufacturing seals for use in blowout preventers, in which the seals may include elastomeric and rigid materials. More particularly still, embodiments disclosed herein relate to empirical methods of curing and manufacturing seals for use in blowout preventers. Alternatively, embodiments disclosed herein relate to analytical methods of designing, curing, and manufacturing seals for use in blowout preventers.

Seals, as described above, may include both rigid and elastomeric materials. As used herein, a "rigid material" refers to any material that may provide structure to a seal of a blowout preventer, both metal and non-metal. Examples for a rigid material may include, but are not limited to, steel, bronze, and high strength composites (e.g., carbon composites, epoxy composites, and thermoplastics, among others). Further, as used herein, a "seal" refers to a device that is capable of separating zones of high pressure from zones of low pressure. Examples of blowout preventer seals include, but are not limited to, packing units, annular packing units, top seals, and variable bore rams. Also, as used herein, "elastomeric material" refers to thermoplastics, thermosets, rubbers, and other polymeric compounds that exhibit elastic behavior and commonly used for seals, o-rings, and the like.

Seals may be manufactured by conventional molding processes, accounting for changes to the manufacturing process as described in more detail below with respect to various embodiments. In some embodiments, the seals may be molded and cured sequentially in a single mold cavity. In other embodiments, the seals may be molded in a mold cavity and subsequently cured in a curing chamber (mold cavity and curing chamber may be used interchangeably herein).

For example, in some embodiments, rigid materials may be disposed in a mold, and the mold may be closed and filled, as necessary, with at least one molten elastomeric material (i.e., molding then curing). In other embodiments, a previously molded and uncured seal may be disposed in a curing chamber (i.e., curing only). The mold or curing chamber may be heated to an elevated temperature before or after the rigid and elastomeric materials are disposed in the mold.

The temperature of the materials disposed in the mold cavity may then be increased to a temperature sufficient to cure the elastomeric material. For example, heat may be supplied by steam, oil or other fluids, or by electric heating elements. After sufficient time at the cure temperature, the cured part is removed from the mold cavity and allowed to cool. The seal may optionally be post-cured, such as by holding the part at a post-cure temperature or slowly cooling the part, may also be used to generate desired properties.

In general, variables that may affect properties of the cured seal may include initial mold temperature, heating rates, cooling rates, and mold temperature. Typically, the temperature of the mold or curing chamber is maintained based upon the measured temperature of the heat exchange medium. Heating and cooling rates may be influenced, for example, by the type of heat exchange medium (electric, fluid, type of fluid, and the respective thermodynamic properties of the fluid), as well as the mold material (e.g., type of steel and its properties). The amount of time that the materials are at a given temperature will also affect the degree of curing.

Properties of the seal may also be affected by the type and amount of elastomeric material(s) used, the type of rigid material used, their thermodynamic properties (conduction coefficients, for example), and, if used, the type and amount of any curing agents or other additives. Seal properties may also be affected by the variations in the kinetic properties of the elastomeric material and/or curing agents.

Figure 11:
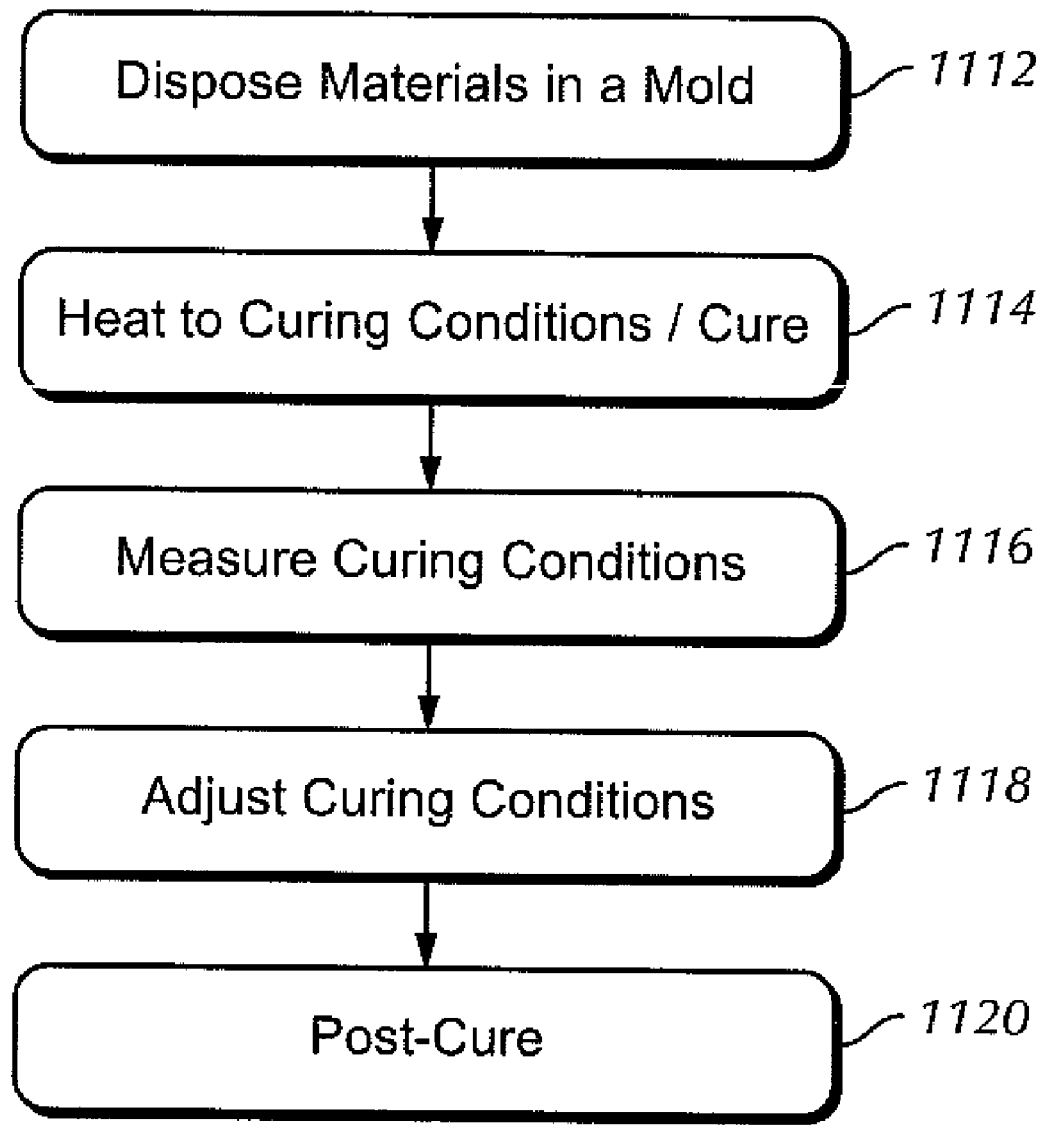
FIG. 11 is a flow chart illustrating a seal manufacturing process according to embodiments disclosed herein.

Referring now to FIG. 11, a method of manufacturing a seal according to embodiments disclosed herein is illustrated, where the seals may be manufactured by measuring the temperature of the elastomeric material during the curing step. As above, the rigid and elastomeric materials may be disposed 1112 in the mold. The temperature of the materials disposed in the mold may then be increased to a temperature sufficient to cure 1114 the elastomeric material.

While the part is curing, the temperature of the elastomeric material may be measured 1116. For example, in some embodiments, a thermocouple may protrude from the mold or curing chamber cavity into one or more sections of the elastomeric material. The location and depth of penetration of the thermocouple may be based upon the seal design, preferably limiting the negative impact that the thermocouple may have on the finished part. In other embodiments, the thermocouple may measure the temperature of a tab or extra material to be trimmed from the finished part. In yet other embodiments, a separate chamber may be used to measure the temperature of an elastomeric material in parallel to a seal being cured, where the separate chamber may have similar or dissimilar dimensions as the seal being cured, allowing for an approximation of the temperature of the seal being cured.

The temperature of the mold or curing cavity, via the temperature of the heat exchange medium, may then be adjusted 1118 based upon the measured temperature. For example, exothermic cross-linking reactions may generate excess heat, causing the temperature of the elastomeric material to be higher than desired for curing the seal. As the cross-linking reaction slows, the temperature of the elastomeric material may decrease to a temperature less than desired for curing the seal. Measuring the temperature of the elastomeric material may facilitate control of the temperature of the mold, and hence the elastomeric material, throughout the curing step.

Measuring the temperature of the elastomeric material may also allow adjustment of the curing time, or the time the elastomeric material is exposed to curing temperature, such that the desired seal properties may be developed. For example, if the elastomeric material increases from injection temperature to curing temperature slowly, the curing time may be extended to account for the time at a temperature lower than curing temperature. As another example, if the curing temperature fluctuates during curing, the curing time may be cut short or extended to account for the fluctuations.

Additionally, because heat must be conducted through the thickness of the elastomeric material, the interior portion of the elastomeric material may be at a different temperature than the elastomeric material proximate the mold. Higher than desired temperature may cause excess cross-linking, resulting in a rigid material. Lower than desired temperatures may result in less than the desired cross-linking. Measuring the temperature of the elastomeric material may allow for adjustment of the curing temperatures and curing times such that the elastomeric material proximate the mold does not overly crosslink, and such that the interior portions of the elastomeric material sufficiently crosslink.

Following the curing of the elastomeric material in the seal, the seal may be post-cured 1120, if desired. The temperature measurements during the heating and curing step may be used to adjust a post-cure temperature or a post-cure time. Similarly, temperature may be measured during the post-cure, and post-cure temperature and time may be adjusted to result in the desired seal properties.

In preferred embodiments, an experimental test conducted on the packer seals covers experimental, theoretical, and FEA based analytic studies aimed at determining the proper state of cure for the packer seals. In the experiment, thermal curing of the packer seals was carried out and temperature data was gathered at prescribed locations within the packer seal body using thermocouples. From the results of the thermocouple study, certain embodiments may use a seven-hour curing cycle when molding the packer seals.

Further, the thermal curing and data acquisition test procedure was used to validate an FEA simulation in which the geometry of the mold and thermal properties of the metal and rubber compound were also modeled. Accordingly, temperature distributions through the packer seal versus time were obtained by the FEA analysis method. These results matched very closely with the thermocouple data obtained from within the packer seal units. This close comparison between temperature distribution calculated from the FEA analysis and those obtained from the cure test thermocouple reading validated the accuracy of the FEA method. The FEA method may be a simpler and more efficient alternative to the experimental approach using the thermocouples, and may therefore be used more frequently in determining the state of cure of a molded rubber product and improving quality and functional life.

FEA Model

As mentioned above, techniques and models historically used to design and manufacture seals having elastomer and rigid materials for blowout preventers may not provide accurate information to improve the manufacture and performance of the seal's design. For example, non-uniform heating processes, varying material thicknesses, material property variations, etc. may cause unreliable predictions of proper curing parameters. Therefore, in designing and manufacturing a seal for a blowout preventer in accordance with embodiments disclosed herein, a method including FEA of the system during the curing stage may be used to improve the design and manufacture of seals. This FEA method, in addition to certain techniques for generating and modifying the seal models, may more accurately calculate the degree of curing of the elastomeric material during the curing cycle. Suitable software to perform such FEA includes, but is not limited to, ABAQUS (available from ABAQUS, Inc.), MARC (available from MSC Software Corporation), and ANSYS (available from ANSYS, Inc.).

Specifically, embodiments and methods disclosed herein may advantageously provide techniques for generating and analyzing seal models within FEA to determine the seal's response under various temperature and time profiles. Methods disclosed herein may use a simplified seal design and/or model of a seal to assist in the analysis of the seal. For example, methods disclosed herein may avoid analyzing portions of a complex seal design by "smoothing" that design.

As used herein, the term "smoothing" refers to various techniques to simplify a complex geometry of a seal design for use with FEA. These techniques may allow the analysis of a smoothed model (i.e., a FEA model constructed from a smoothed design) to correlate with experimentally observed conditions and to converge to a definitive result when analysis of a non-smoothed model may not. As such, a model constructed from a smoothed design may be analyzed within FEA to determine an overall, or "bulk" condition. By analyzing this bulk (i.e., non-localized) condition, the curing of a seal under various time and temperature conditions may be predicted with more accuracy. Following the analysis of the smoothed model for the bulk condition, knowledge obtained therefrom may be incorporated into a (non-smoothed) seal design that is to be manufactured.

Figure 12:
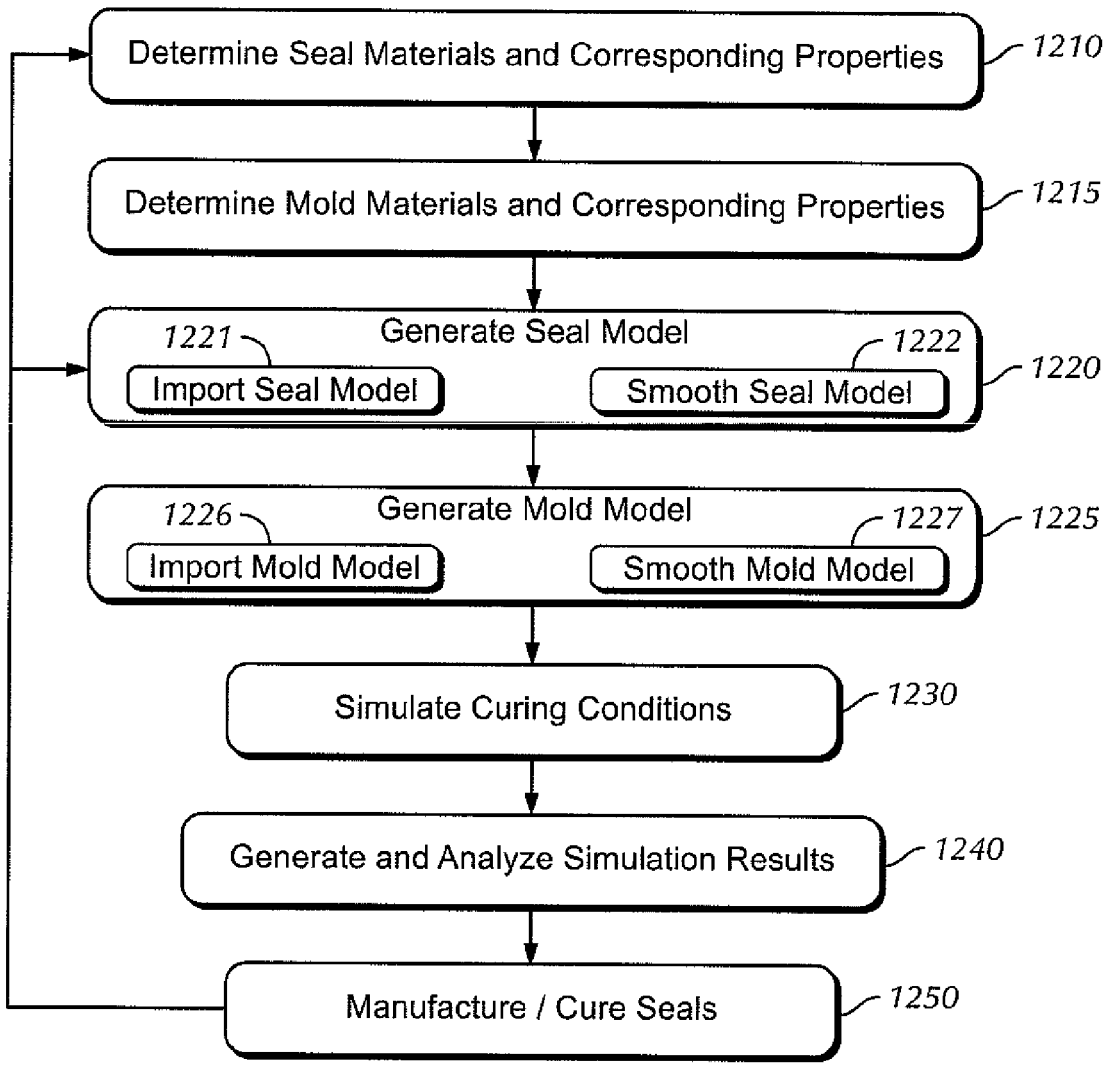
FIG. 12 is a flow chart depicting a method of manufacturing a seal for a blowout preventer in accordance with embodiments disclosed herein.

Referring now to FIG. 12, a flow chart depicting a method of manufacturing a seal including an elastomer and a rigid material is shown. As a first step 1210, properties of the seal's materials (e.g., the elastomers, the rigid materials, and cross-linking agents, if used) are determined. The material properties may either be determined through empirical testing or, in the alternative, may be provided from commercially available material properties data. The material properties may include, for example, conductivity and other thermodynamic properties, as well as kinetic rate constants, decomposition temperatures, concentration of reactive groups, and other material properties that may affect reactivity of the materials.

As a second step 1215, properties of the mold materials (e.g., the metal forming the mold and the heat exchange medium, among others) are determined. The material properties may either be determined through empirical testing or, in the alternative, may be provided from commercially available material properties data. The material properties may include, for example, conductivity, viscosity, convective heat transfer constants, and other thermodynamic properties. Properties of the mold materials may provide for determination of seal boundary condition.

Next, a three-dimensional seal model (i.e., a mesh) for the seal is generated 1220. As such, generating a seal model 1220 may also comprise importing a seal design 1221 and subsequently smoothing the imported seal design 1222 to simplify FEA analysis.

Next, if desired for increased accuracy of the curing model, a three-dimensional mold model (i.e., a mesh) for the mold is generated 1225. As such, generating a mold model 1225 may also comprise importing a mold design 1226 and subsequently smoothing the imported mold design 1227 to simplify FEA analysis.

Although indicated as two separate models, a three dimensional model of the seal disposed within the mold may also be generated. However, as curing may continue after the seal has been removed from the mold or from the curing cavity, as the seal cools, a seal model separate from a mold model, may account for the continued curing that occurs outside of the mold. In some embodiments, the mold model and the seal model are integrated such that the mold model may provide boundary conditions for the seal model during each iteration; a step change in boundary conditions may then be used for modeling the post-curing of the seal after removal from the mold cavity.

Next, curing conditions (e.g., time and temperature conditions) are simulated 1230 in FEA using the seal model 1220 (or smoothed seal model 1222) and, optionally, the mold model 1225 (or smoothed mold model 1227). Preferably, these simulated curing conditions reflect the heat transfer, crosslinking reactions, and changes in properties that the seal may expect to experience during curing. Further, after simulating curing conditions, a plot showing the curing occurring in the seal model may be generated and analyzed 1240. Ideally, the plot shows the location and amount of curing occurring in the seal model in response to the simulated curing conditions. The plot may be analyzed and reviewed 1240 to determine the performance characteristics of the seal model.

The method may loop back to 1210 to account for changing material properties of the seal during the curing process, or alternatively may loop back to 1220 for generation and analysis of another seal model. These loops allow the seal model to be further simulated in FEA to determine its performance after further modifications or models. Otherwise, if the seal model is considered acceptable and meets specified criteria, the seal model may be used in the manufacture 1250 a seal for a blowout preventer.

In step 1220, a model (i.e., a mesh) for the seal is generated. When generating the model of the seal, design features of the seal are chosen and applied to the model. For example, for an annular blowout preventer packing unit, the number of inserts used, the width of the rigid material inserts, and the specific material used for the rigid material inserts may be chosen when generating the seal model. The seal models may be created in a computer aided design ("CAD") software package (e.g., AutoCAD available from Autodesk, Inc., and Pro/Engineer available from Parametric Technology Corporation) and imported into the FEA software package or, in the alternative, may be generated within the FEA packages (e.g., ABAQUS and PATRAN) themselves.

Figure 13:
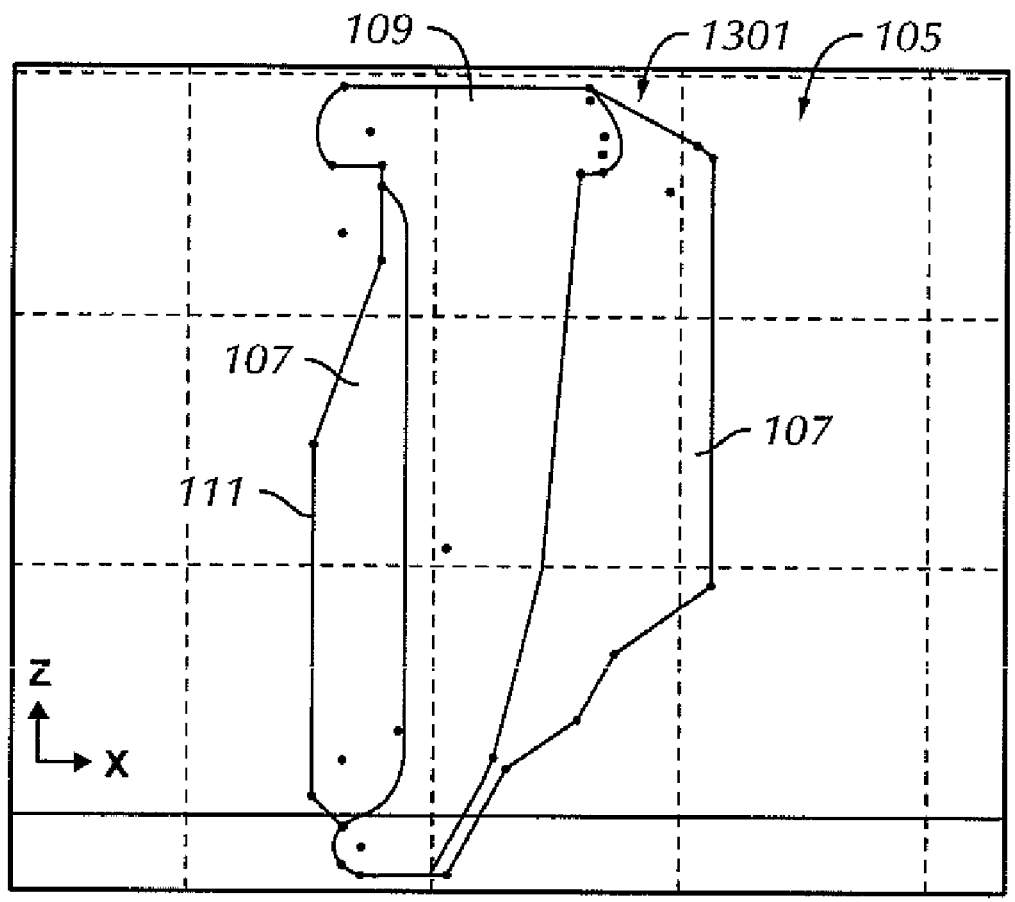
FIG. 13 is a cross-sectional, axial profile of an annular packing unit in a two-dimensional plot (using x and z axes) in accordance with embodiments disclosed herein.

Referring now to FIGS. 13-16, a method of generating a seal model in accordance with embodiments disclosed herein is shown. Specifically, as shown, a model of an annular blowout preventer packing unit 105 may be generated from a seal design created using CAD software. As shown in FIG. 13, cross-sectional axial profiles 1301 of a seal design may be generated of annular packing unit 105 in a two-dimensional plot (using x and z axes). Packing unit 105 includes elastomeric body 107 and rigid (e.g., metal) material insert 109 with bore 111. Multiple radial and axial cross-sectional profiles may be generated to represent different sections of the seal. For example, profiles may be generated of the sections of a packing unit 105 that do or do not have metal inserts 109.

Figure 14:
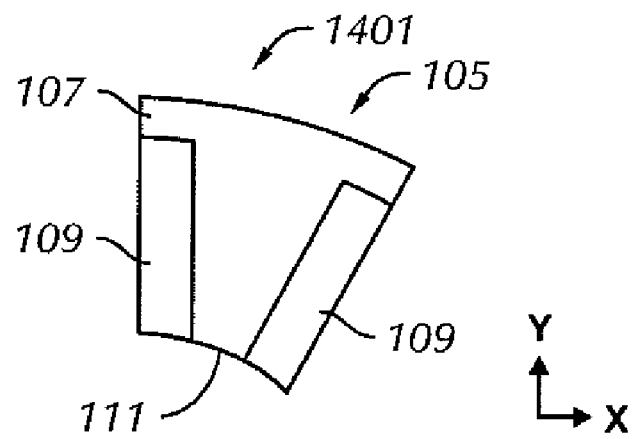
FIG. 14 is a cross-sectional, radial profile of an annular packing unit in a two-dimensional plot (using x and y axes) in accordance with embodiments disclosed herein.
Figure 15:
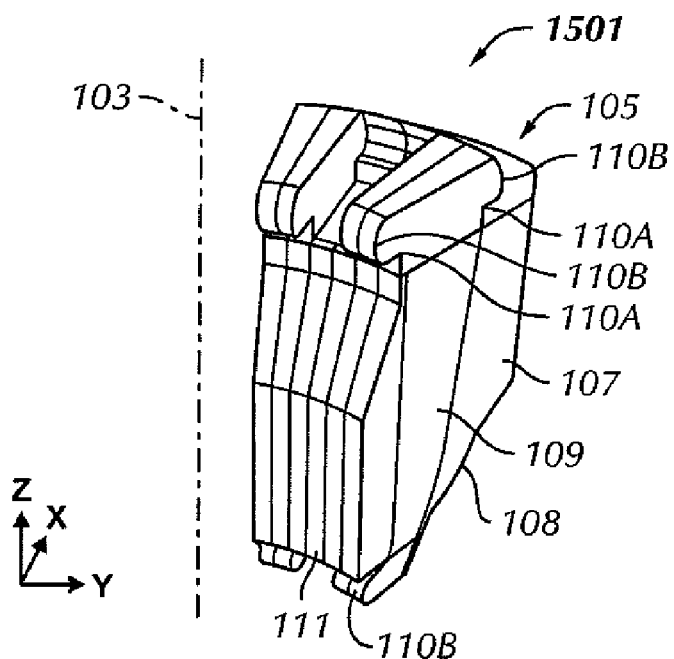
FIG. 15 is a portion of a seal model of an annular packing unit in a three-dimensional plot (using x, y, and z axes) in accordance with embodiments disclosed herein.

From here, as shown in FIG. 14, in addition to generating cross-sectional, axial profiles 1301, cross-sectional, radial profiles 1401 of the seal design may be generated to represent different radial sections of the seal in a two-dimensional plot (using x and y axes). Because of the symmetry of packing unit 105, only a radial portion of cross-sectional, radial profiles 1401, as shown, may need to be generated. Then, as shown in FIG. 15, by combining axial and radial profiles 1301, 1401, a three-dimensional seal design 1501 may be generated to represent at least a portion of packing unit 105 in a three-dimensional plot (using corresponding x, y, and z axes from FIGS. 13 and 14). In three-dimensional seal design 1501, metal inserts 109 and elastomeric body 107 are generated as separate bodies which may interact with one another. Depending on the complexity of the design of the seal (i.e., a packing unit in this case), more profiles 1301, 1401 of the seal may be generated for more detail in seal design 1501.

Further, as shown, seal design 1501 and model or mesh 1601 (discussed below) may only represent a radial portion of packing unit 105. However, the remainder of packing unit 105 may be easily generated by taking advantage of the symmetrical geometry of packing unit 105. Those having ordinary skill in the art will appreciate that in the case of radially symmetric models, symmetric portions and profiles may be used and replicated to simplify the generation of the model.

Figure 16:
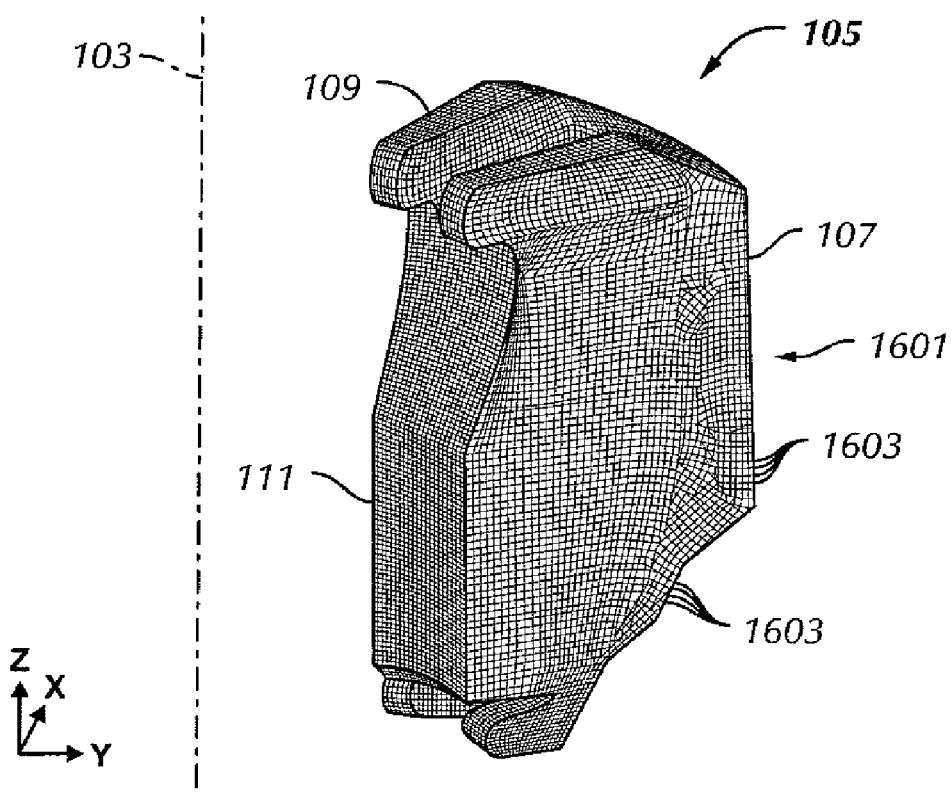
FIG. 16 is a portion of a seal mesh of an annular packing unit in a three-dimensional plot (using x, y, and z axes) in accordance with embodiments disclosed herein.

Referring now to FIG. 16, seal design 1501 created using CAD software may be imported into FEA software to generate a model or mesh 1601 of numerous finite elements 1603. Finite elements 1603 of mesh 1601 work together to simulate a seal and a packing unit when curing conditions are applied. Finite elements 1603 of elastomeric body 107 of packing unit 105 will simulate and respond to curing conditions (i.e., they will exhibit reactivity and conductivity) corresponding to the thermodynamic and kinetic properties of the elastomeric material.

Similarly, finite elements 1603 of metal inserts 109 of packing unit 105 will simulate and respond to curing conditions corresponding to the material properties of the metal inserts. Thus, finite elements 1603 exhibit conductivity, expansion, and other thermodynamic properties to simulate the response of the different materials (e.g., elastomers and rigid materials) of the seal in accordance with their material properties. While finite elements 1603 are shown as eight-noded elements (i.e., brick elements), finite elements of any shape known in the art may be used.

Further, while generating a seal model 1220, a number of smoothing techniques may be used on the seal design 1222. In many circumstances, as mentioned above, analyzing the actual manufactured geometry of the seal using FEA may lead to complications when complex geometries are simulated. Particularly, as manufactured, the geometry of metal seal components include radiused corners and other stress-concentration reducing features to more evenly distribute stress across the component as it is loaded during use. However, it has been discovered that these radiused corners may adversely affect FEA models in FEA in that they increase the complexity of the model and may prevent the FEA from producing accurate results. Therefore, a seal concentration features in an effort to improve the results of FEA.

Figure 17A:
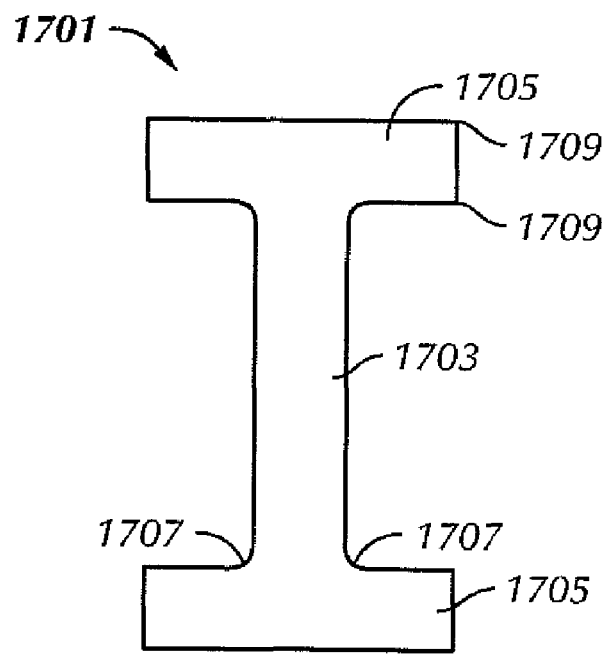
FIG. 17A is an end view of a metal insert for a packing unit for an annular blowout preventer.
Figure 17B:
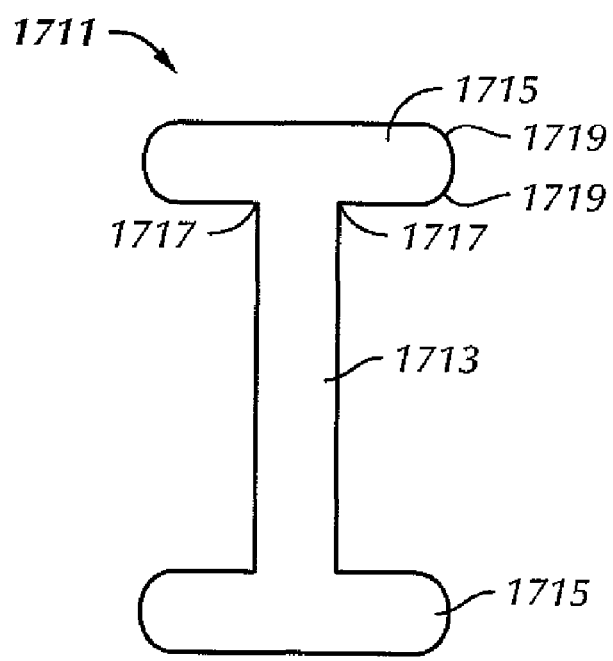
FIG. 17B is an end view of a metal insert for a packing unit for an annular blowout preventer in accordance with embodiments disclosed herein.

In one embodiment, the seal design's rigid material may be modified (i.e., smoothed) to reduce their complexity. Referring now to FIG. 17A, an end view of a metal insert 1701 including flanges 1703 connected by a web 1705 is shown. Metal insert 1701 typically includes radiused internal corners 1707 and squared external corners 1709. However, in one embodiment of smoothing a design, the corners of the metal insert may be modified. For example, referring now to FIG. 17B, an end view of a metal insert 1711 design including flanges 1713 connected by a web 1715 in accordance with embodiments disclosed herein is shown. In smoothing the design, internal corners 1717 may be modified to reduce or eliminate their radii (as shown) in an attempt to simplify a subsequently constructed model. Further, in smoothing the seal design, external corners 1719 may be modified to add or increase their radii (also shown) in an attempt to simplify a subsequently constructed model. A seal model constructed in this manner may be analyzed for bulk conductivity and curing such that the FEA may produce more accurate and definitive results than would be possible using the former, more "localized" approach.

Figure 18A:
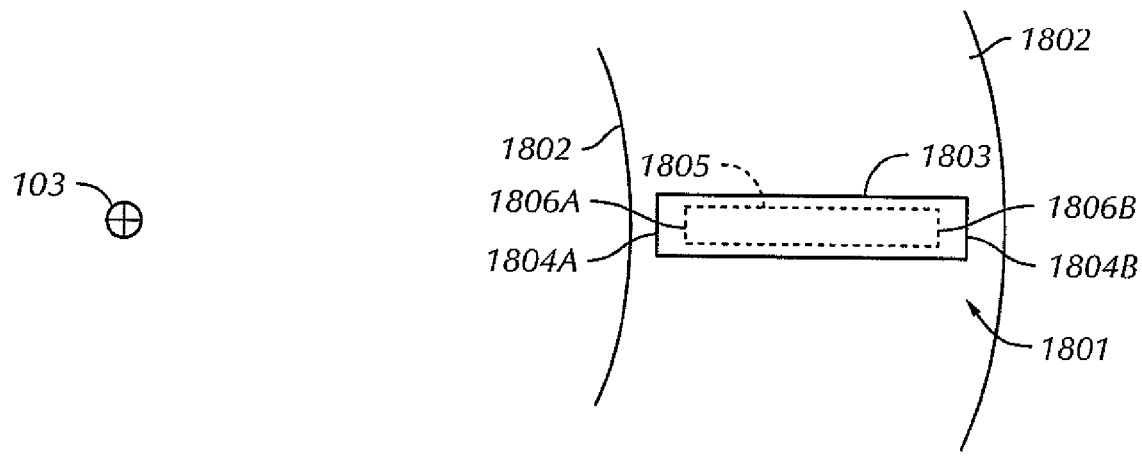
FIG. 18A is a top view of a metal insert for a packing unit for an annular blowout preventer.

Furthermore, in another embodiment, instead of smoothing the design by modifying internal and external corners of the rigid material insert, the smoothing may include modifying the shape of the rigid material insert and its position within the elastomeric body. Referring now to FIG. 18A, a top view of a metal insert 1801 disposed within a portion of an elastomeric body 1802 of an annular packing unit is shown. Flange 1803 and web 1805 (outline shown) of metal insert 1801 shown has a rectangular outline, in which flange ends 1804A, 1804B of flange 1803 and web ends 1806A, 1806B of web 1805 are defined by straight edges. Ends 1804A, 1806A are radially closer to central axis 103 than ends 1804B, 1806B.

Figure 18B:
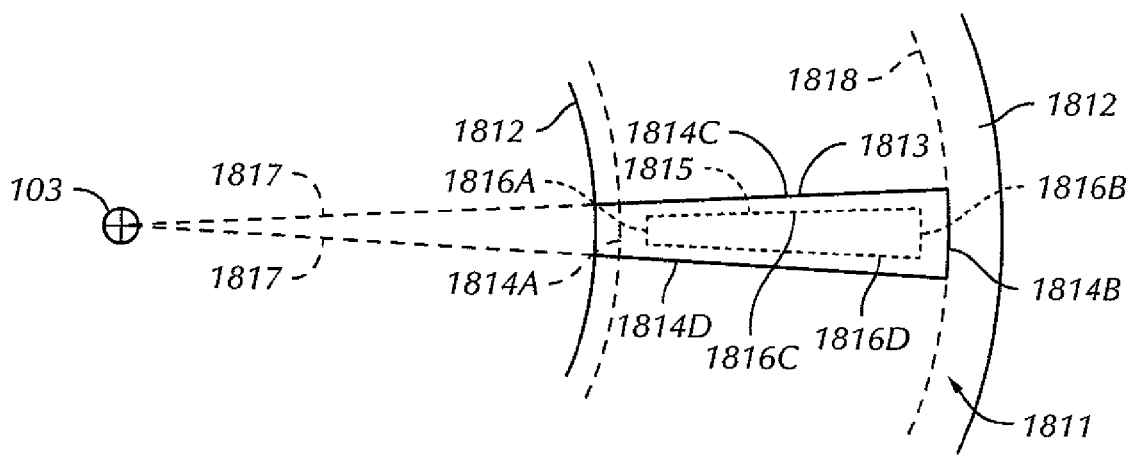
FIG. 18B is a top view of a metal insert for a packing unit for an annular blowout preventer.

However, referring to FIG. 18B, the shape and orientation of the metal insert may be smoothed for bulk strain analysis. In FIG. 18B, a top view of a metal insert 1811 disposed within a portion of an elastomeric body 1802 of an annular packing unit in accordance with embodiments disclosed herein is shown. As shown, flange 1813 and web 1815 (outline shown) of metal insert 1811 have arcuate ends to define a radial outline centered about central axis 103. Specifically, sides 1814C, 1814D of flange 1813 may follow along radial lines 1817 extending radially out from central axis 103. Sides 1816C, 1816D of web 1815 may similarly follow along radial lines (not shown). With this, flange ends 1814A, 1814B disposed between flange sides 1814C, 1814D and web ends 1816A, 1816B disposed between web sides 1816C, 1816D may then follow an arcuate path to have an arc, bow, or bend, as shown. Preferably, arcuate ends 1814A, 1814B, 1816A, 1816B follow radial paths 1818 defined about central axis 103. Thus, as shown, a width of flange 1813 and web 1815 increases when following along their sides 1814C, 1814D, 1816C, 1816D from ends 1814A, 1816A to ends 1814B, 1816B. As such, a seal model constructed in this manner may be able to more accurately simulate curing during FEA to produce more accurate and definitive results.

Similarly, the elastomeric body of the seal design may be smoothed as well. Referring again to FIG. 15, elastomeric body 107 includes a compression face 108 corresponding to wedge face 118 of piston 117 (FIG. 1). For example, the seal design may be smoothed by modifying the corners and/or radii of compression face 108. By modifying the compression face and other portions of the elastomeric body, a seal model constructed therefrom may be able to more accurately simulate curing during FEA. Those having ordinary skill in the art will appreciate that, in addition to these described smoothing techniques and modifications, other techniques may be used as well.

Referring again to FIG. 12, when generating the seal models in step 1220, especially when smoothing the seal design 1222 of the seal model, the volume of the elastomeric body and the rigid material inserts of the seal model remains substantially constant. If the volume does not remain constant, the results and simulated curing created by the FEA may not be accurate or consistent. Using this concept, the respective volumes of the elastomeric body and the rigid material inserts preferably remain substantially constant to provide accurate results.

Continuing now with step 1230, curing conditions are simulated upon a seal for a blowout preventer in FEA using the generated seal model. Preferably, the simulated curing conditions are temperatures and times at the given temperatures that the seal may expect to experience during curing. For example, a model of a packing unit of an annular blowout preventer may simulate curing conditions correlating to developing a desired resilience of the elastomeric material (i.e., developing sufficient crosslinking).

In step 1240, a curing plot, showing curing and development of physical properties occurring in the seal model in response to curing conditions may be analyzed and reviewed to determine the performance of the modeled seal curing. This technique may be performed by calculating the degree of curing for each element of the seal model with the curing conditions and showing the curing upon each corresponding element of the seal model in the original condition. This may allow the curing occurring in the packing unit under the simulated curing conditions to be "mapped" back to its original location and condition in the packing unit.

As described above, seal models may be used to estimate the degree of curing under various conditions, including variations in curing times and temperatures, the elastomeric and rigid materials chosen, and seal shape or design, among other variables. Additionally, mold models may account for lag times and difference in boundary conditions (e.g., temperature variations in the mold) that the seal may experience during the curing process. For example, an initial temperature of the mold may vary, such as may result from the mold being opened for loading of the seal or the rigid materials, where the time the mold is open and exposed to ambient conditions may vary.

Other seal model elements may account for geometry, conductivity, cure rates/reaction rates, heating and cooling rates, decomposition rates and reactivity, and other thermodynamic or kinetic properties, among others. For example, with respect to geometry, thinner portions of the elastomeric material may be exposed to higher average temperatures than thinner portions due to the conductivity of the metal or location of heating elements within the mold. Seal models and mold models may be used, in some embodiments, to design mold cavities such that excessive heating of the elastomeric material may be avoided, such as by selective placement of the heating elements, for example. Seal models may also be used to calculate a degree of crosslinking or other properties that may be influenced by a post-curing operation.

In some embodiments, the above described models may be verified or correlated using empirical data to verify the model. For example, empirical data may be gathered by measuring the temperature of the heat transfer medium, portions of the mold, and/or the elastomeric material during curing processes, as described above. Additionally, data regarding the degree of curing resulting from the measured curing conditions may be obtained. The measured curing conditions and the resulting seal properties may then be used to verify or correlate the model to actual test results. As examples of correlating the model to empirical data, kinetic rate constants, conductivity, or conductive and convective heat transfer coefficients may be adjusted from theoretical values to result in a better approximation of actual curing.

In other embodiments, when correlating a model or by using a verified model, the model may be used to evaluate thermocouples and other equipment used to control the temperature set points during the curing process. For example, thermocouples that may be located proximate the mold/seal interface, measuring the temperature of the heat transfer medium, measuring the energy input/output from an electrical heater, and others, may be inaccurate, affecting the actual heat input to one or more portions of the mold cavity. The seal/mold model may be used to analyze if there are inaccuracies in the measured data. In this manner, the model may be adjusted to account for variations in the measured temperature profile, or the model may be used to adjust the temperature profile input by an operator, and may provide a means to improve the curing and/or consistency of seals by adjusting actual cure conditions to account for the inaccuracy.

The above described seal model (and mold model if used) may be used to determine curing conditions for a wide variety of material combinations. For a given seal model (geometry), a multitude of various elastomeric materials, rigid materials, curing aids (crosslinking agents), and other variables may be simulated such that curing conditions and resulting seal properties may be optimized for that particular seal model (geometry).

In some embodiments, a second seal model may be generated based upon a first seal model generated as described above. For example, the model may be changed to reflect different seal geometries. Material properties and other variables as described above, and which may nave been correlated to empirical data, may then be used to estimate the curing obtained for a seal having geometry different than that of the first seal model. In this manner, various geometries may be simulated to optimize both curing and the resulting seal properties.

For example, the FEA model may be used to adjust the above described variables to arrive at a desired strength, resilience or other seal properties. In some embodiments, the seal model may provide physical property data resulting from the curing process, such as properties that may be inferred from a degree of crosslinking, including rheometry, modulus of elasticity, flexibility, and toughness, among other properties.

In other embodiments, the resulting seal properties may be integrated with FEA models used to analyze the performance of the seal under stress. Such an FEA model may be used to provide an indication of the cycles before failure, pressure limitations or ratings, stress/strain limitations, and seal validation, among others. Such FEA models are disclosed in U.S. Provisional Patent Application No. 60/847,760, assigned to the assignee of the present disclosure, and incorporated herein by reference.

Use of Model in Manufacture/Curing of Seal

Figure 19:
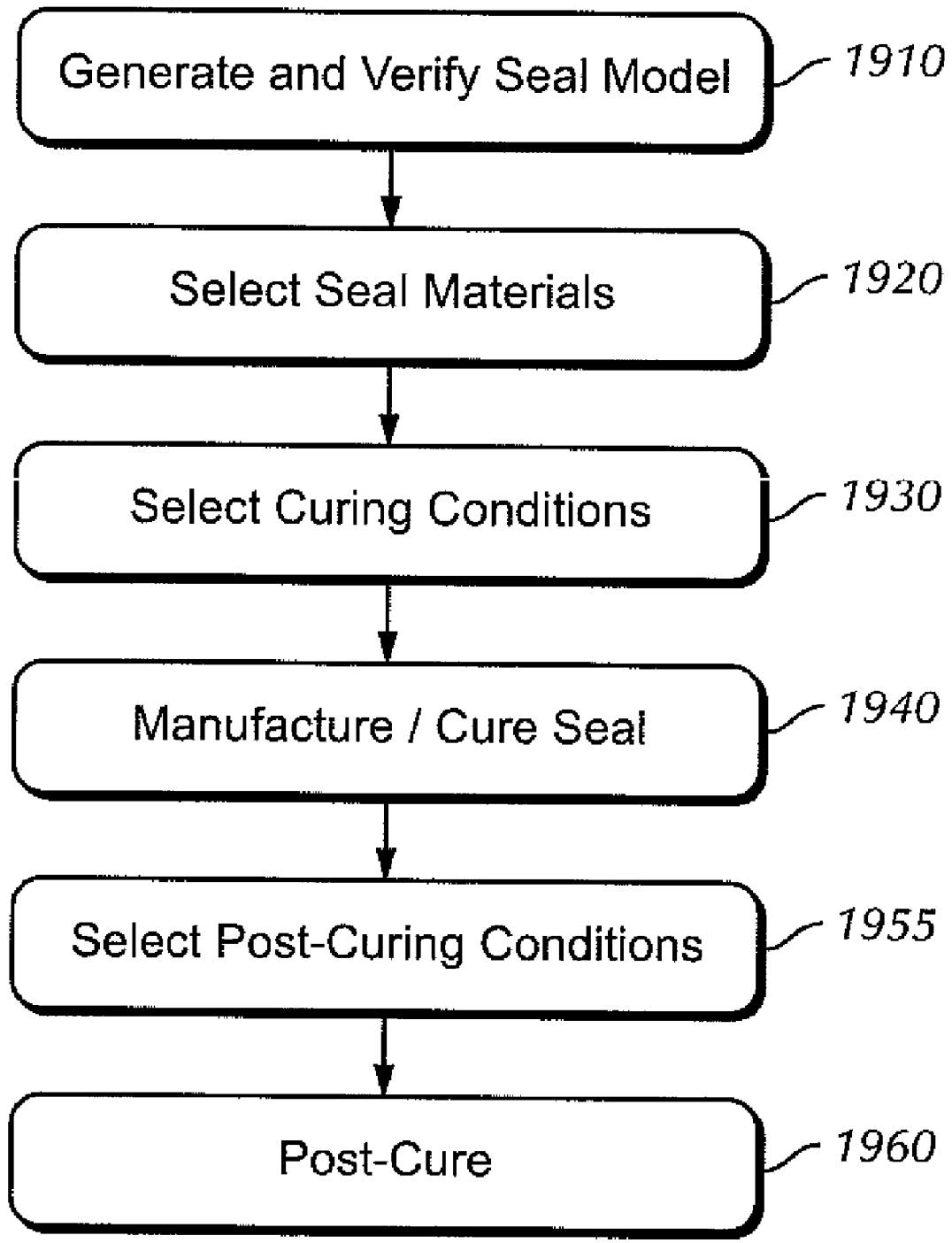
FIG. 19 is a flow chart depicting a method of manufacturing a seal for a blowout preventer in accordance with embodiments disclosed herein.

The above described FEA seal models may be used to optimize materials selections, and may also be used to determine proper curing conditions. In some embodiments, an operator may select cure times and cure temperatures based upon a result from the FEA model, as illustrated in FIG. 19. As an initial step 1910, a seal model may be generated and verified as described above. The model may then be used to select 1920 seal materials (rigid materials and elastomeric materials) appropriate for the desired product properties. The model may then be used to select 1930 curing conditions to be used in the manufacture 1940 of the seal.

For example, FEA may be used to select a cure temperature profile that will provide the fastest cycle time, increasing the number of seals that may be cured per unit time. As another example, FEA may be used to select curing conditions to result in desired seal properties. In other embodiments, FEA may be used to determine curing conditions based upon lot variations (e.g., minor differences in elastomeric material properties between lots) so as to result in the desired seal properties.

Figure 20:
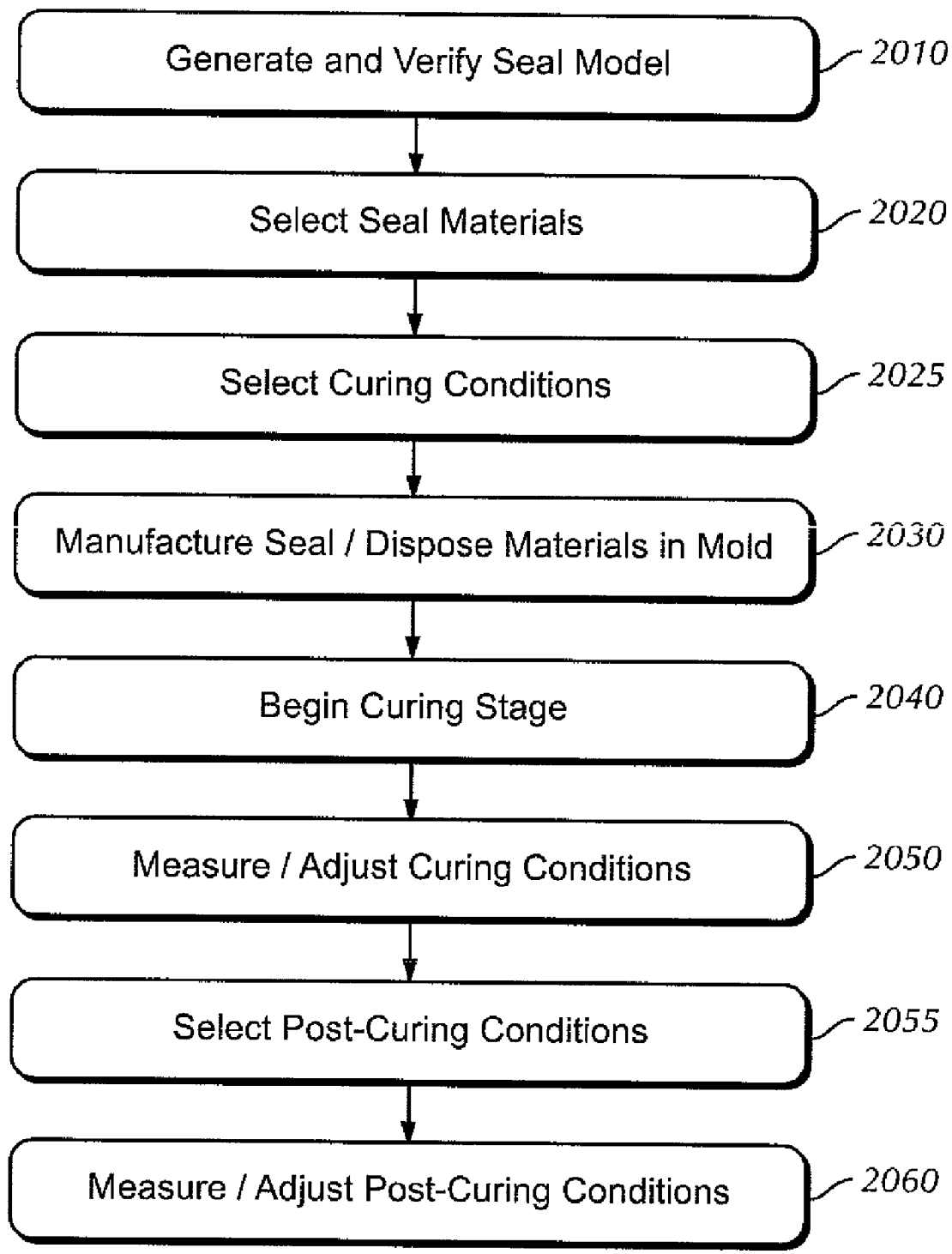
FIG. 20 is a flow chart depicting a method of manufacturing a seal for a blowout preventer in accordance with embodiments disclosed herein.

The above described FEA seal models may also be used to adjust curing conditions, as illustrated in FIG. 20. As an initial step 2010, a seal model may be generated and verified as described above, and may also be used to select 2020 seal materials and select 2025 curing conditions (time and temperature profiles). The seal materials may then be disposed 2030 in a mold cavity for curing 2040 During the curing step 2040, actual temperature measurements may be made and input 2050 to a FEA model. Because of variations in the actual curing conditions and the selected curing conditions, cure times and temperatures may be adjusted based on FEA model results. In this manner, for example, minor variations in curing runs may be accounted for and/or lot variations in seal properties may be minimized.

The above described FEA seal models may also be used to select and/or adjust post-curing conditions. As illustrated in FIGS. 19 and 20, post curing conditions may be selected 1955, 2055 using the FEA model. Following the curing step 1940, 2040, the seal may be post-cured 1960, 2060, where in some embodiments, the post-curing time and temperatures may be adjusted based on measured curing conditions and/or measured post-curing conditions so as to result in the desired seal properties.

As described above, embodiments described herein provide an empirical method to manufacture seals. Measurement of curing conditions during the curing process may be used to adjust the curing conditions to improve upon one or more of product consistency, cure cycle times, and seal properties, among others.

Further, industry requirements, such as API 16A/ISO 13533:2001, may be used as specified criteria to compare and certify a seal model. In particular, API 16A, Section 5.7.2 references a "closure test" for ram-type blowout preventers, while API 16A, Section 5.7.3 references a closure test for annular-type blowout preventers. Under API 16A/ISO 13533: 2001, a packing unit may be required to undergo six closures about the drill pipe and, on a seventh closure, be capable of effectively sealing against pressure of about 200-300 psi (1.4-2.1 MPa).

As described above, seal models may be used to design seals, select seal geometries, select materials used in the manufacture of seals, and may be used to select and adjust curing conditions used for the manufacture of seals. Advantageously, embodiments using seal models as disclosed herein may provide for one or more of improved seal design, improved curing of seals, decrease cure cycle times, improved product consistency, and increased working lifespan, among other advantages.

While the disclosure includes a limited number of embodiments, those skilled in the art, having benefit of this disclosure, will appreciate that other embodiments may be devised that do not depart from the scope of the present disclosure. Accordingly, the scope should be limited only by the attached claims.

What is claimed is:

1. A method to manufacture a blowout preventer seal, the method comprising:
   disposing at least one rigid material insert and at least one elastomeric material in a mold;
   heating the mold to a cure temperature;
   curing the at least one elastomeric material;
   measuring a temperature of the at least one elastomeric material during the curing;
   adjusting a cure time and the cure temperature based on the measured temperature of the elastomeric material; and
   removing the cured blowout preventer seal from the mold.

2. The method of claim 1, further comprising determining a degree of curing of the elastomeric material.

3. The method of claim 2, further comprising generating a finite element analysis thermal model of the blowout preventer seal during curing.

4. The method of claim 3, further comprising using the finite element analysis thermal model to estimate a degree of curing based on a selected cure time and a selected cure temperature.

5. The method of claim 3, further comprising correlating the finite element analysis thermal model with the cure time, measured temperature and degree of curing.

6. The method of claim 5, further comprising manufacturing additional blowout preventer seals based on a result from the correlated finite element analysis thermal model.

7. The method of claim 6, further comprising adjusting a cure temperature and a cure time based on a result from the finite element analysis thermal model.

8. The method of claim 6, further comprising:
   selecting a blowout preventer seal design;
   generating a second finite element analysis thermal model for the selected design based on the correlated finite element analysis thermal model; and
   manufacturing the blowout preventer seal based on a result of the second finite element analysis thermal model.

9. The method of claim 8, wherein the manufacturing comprises selecting a cure time and a cure temperature based on a result of the second finite element analysis thermal model.

10. The method of claim 1, wherein the blowout preventer seal comprises an annular packing unit.

11. The method of claim 1, wherein the blowout preventer seal comprises at least one selected from the group consisting of variable ram packers, ram block bore, and ram block top seals.

12. The method of claim 1, further comprising:
   generating a three-dimensional blowout preventer seal model including the at least one rigid material insert disposed within a portion of an elastomeric body;
   determining a degree of curing of the elastomeric material; and
   generating a finite element analysis thermal model of the blowout preventer seal during curing.

13. The method of claim 12, further comprising smoothing the at least one rigid material insert.

14. The method of claim 12, further comprising smoothing the elastomeric body.

15. A method to manufacturing a blowout preventer seal, the method comprising:
   generating a finite element analysis thermal model for a blowout preventer seal design including at least one rigid material insert disposed within at least a portion of an elastomeric body, wherein the finite element analysis thermal model is used to estimate a degree of curing of the at least one elastomeric material of the blowout preventer seal; and manufacturing the blowout preventer seal based on a result of the finite element analysis thermal model.

16. The method of claim 15, wherein the manufacturing comprises selecting a cure time and a cure temperature based on a result of the finite element analysis thermal model.

17. The method of claim 16, wherein the manufacturing comprises curing an elastomeric material at the selected cure temperature for the selected cure time.

18. The method of claim 15, wherein the manufacturing comprises:
curing an elastomeric material at a selected cure temperature for a selected cure time based on a result of the finite element analysis thermal model;
measuring a temperature of the elastomeric material during the curing; and
adjusting the selected cure time and the selected cure temperature based on the measured temperature.

19. The method of claim 18, wherein the adjusting is further based on a result of the finite element analysis thermal model using the measured temperature.

20. The method of claim 15, wherein the blowout preventer seal comprises an annular packing unit.

21. The method of claim 15, wherein the blowout preventer seal comprises at least one selected from the group consisting of variable ram packers, ram block bore, and ram block top seals.

22. The method of claim 15, wherein the step of generating a finite element analysis thermal model comprises generating a three-dimensional blowout preventer seal model including finite elements of the at least one rigid material insert and the elastomeric body.

23. The method of claim 22, further comprising smoothing the at least one rigid material insert.

24. The method of claim 22, further comprising smoothing the elastomeric body.

* * * * *